(12) United States Patent
Lopez Nieto et al.

(10) Patent No.: US 8,732,303 B2
(45) Date of Patent: May 20, 2014

(54) USAGE-SENSITIVE POLICY AND CHARGING CONTROL METHOD, SERVERS, SYSTEMS AND COMPUTER PROGRAMS

(75) Inventors: Ana Maria Lopez Nieto, Madrid (ES); Miguel Angel Muñoz De La Torre Alonso, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 224 days.

(21) Appl. No.: 13/279,750

(22) Filed: Oct. 24, 2011

(65) Prior Publication Data

US 2012/0136992 A1     May 31, 2012

Related U.S. Application Data

(60) Provisional application No. 61/418,575, filed on Dec. 1, 2010.

(30) Foreign Application Priority Data

Nov. 29, 2010     (EP) .................................... 10192887

(51) Int. Cl.
*G06F 15/173*     (2006.01)
(52) U.S. Cl.
USPC ............................... 709/224; 370/252; 726/1
(58) Field of Classification Search
USPC ........................................................ 709/224
See application file for complete search history.

(56) References Cited

U.S. PATENT DOCUMENTS

2010/0235877 A1\* 9/2010 Hu et al. .......................... 726/1
2012/0026897 A1\* 2/2012 Guichard et al. ............ 370/252
2013/0122860 A1\* 5/2013 Dhruva et al. ................ 455/406

FOREIGN PATENT DOCUMENTS

WO     WO 2009/082806 A1     7/2009

OTHER PUBLICATIONS

3GPP. $3^{rd}$ Generation Partnership Project; Technical Specification Group Services and System Aspects; Policy and Charging Control Architecture (Release 10). 3GPP TS 23.203 v10.1.0. Sep. 29, 2010.
Balbas, et al. Policy and Charging Control in the Evolved Packet System. IEEE Communications Magazine. vol. 47 No. 2. Feb. 1, 2009. pp. 68-74.

(Continued)

*Primary Examiner* — Yves Dalencourt

(57) ABSTRACT

In a policy and charging control method carried out by a server including a policy and charging enforcement function (PCEF), identification information for identifying a particular service instance of a particular service type is obtained. When a packet is received, the PCEF determines whether the packet belongs to the particular service instance by using the identification information and by inspection of at least one of Open Systems Interconnection (OSI) layer n control information of the packet, wherein n is an integer equal to or larger than 3, and the packet's payload. If it is determined that the packet belongs to the particular service instance, the PCEF updates a usage parameter representing an accumulated usage associated with the particular service instance. The PCEF then makes available to a policy and charging rules function (PCRF), the usage parameter or information derived therefrom.

9 Claims, 21 Drawing Sheets

(56) References Cited

OTHER PUBLICATIONS

3GPP. 3rd Generation Partnership Project; Technical Specification Group Services and System Aspects; Study on Policy solutions and enhancements (Release 10). 3GPP TR 23.813 V0.1.0 (Nov. 2009).
3GPP. 3rd Generation Partnership Project; Technical Specification Group Services and System Aspects; Policy and charging control architecture (Release 9). 3GPP TS 23.203 V9.3.0 (Dec. 2009).
3GPP. 3rd Generation Partnership Project; Technical Specification Group Core Network and Terminals; Policy and Charging Control over Gx reference point (Release 9). 3GPP TS 29.212 V9.2.0 (Mar. 2010).
3GPP. 3rd Generation Partnership Project; Technical Specification Group Core Network and Terminals; Policy and Charging Control over Rx reference point (Release 9). 3GPP TS 29.214 V9.2.0 (Dec. 2009).

* cited by examiner

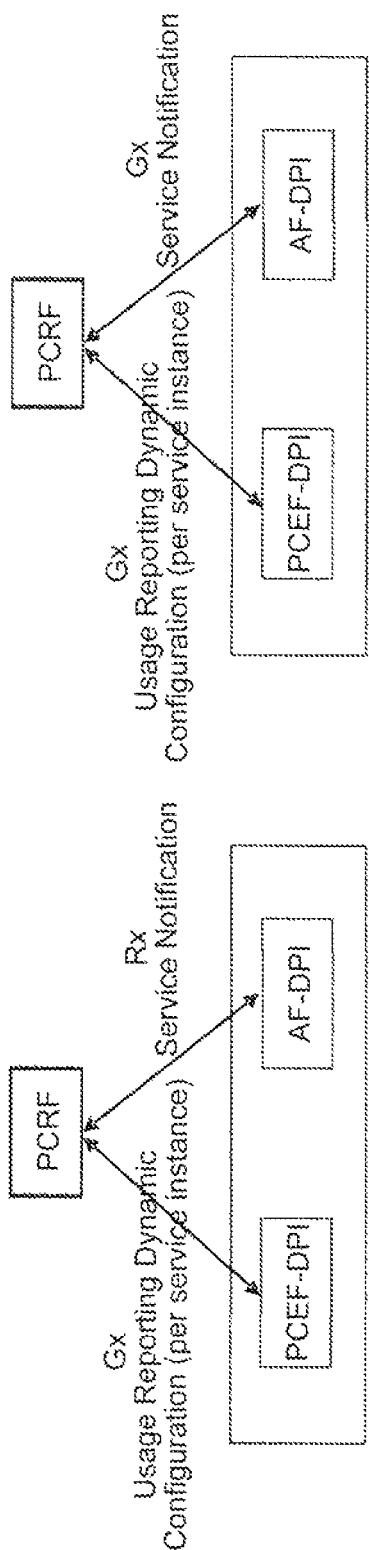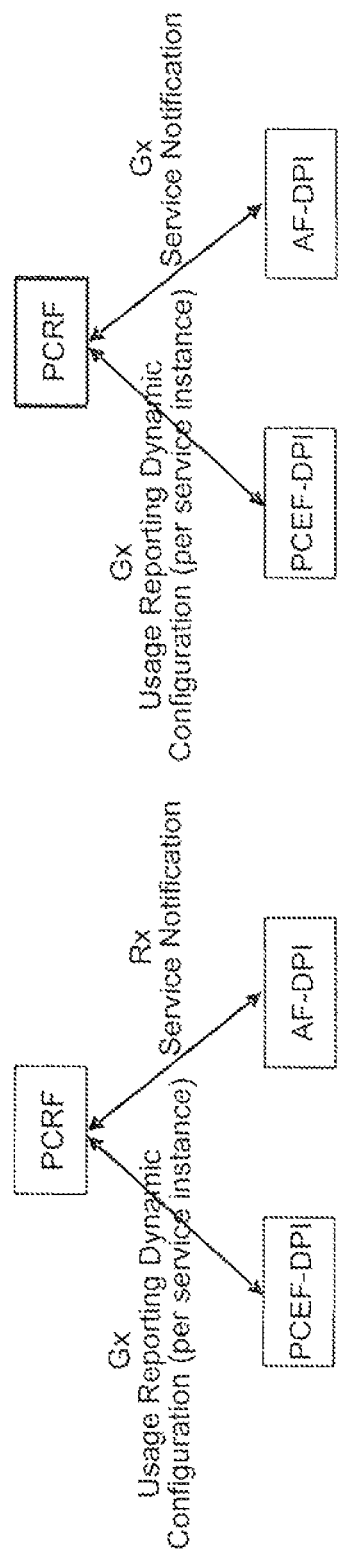
Fig. 22a
Fig. 22b
Fig. 22c
Fig. 22d

US 8,732,303 B2

1

USAGE-SENSITIVE POLICY AND CHARGING CONTROL METHOD, SERVERS, SYSTEMS AND COMPUTER PROGRAMS

This application claims the benefit of U.S. Provisional Application No. 61/418,575 filed Dec. 1, 2010, the disclosure of which is fully incorporated herein by reference.

TECHNICAL FIELD

The present invention relates to policy and charging control methods carried out by a plurality of network nodes or servers. The invention also relates to a server configured for implementing a policy and charging enforcement function (PCEF), to a server configured for implementing a policy and charging rules function (PCRF), to a server configured for implementing an application function (AF), to a system including these servers and functions, and to computer programs comprising instructions configured, when executed on a server, to cause the server to carry out policy and charging control procedures.

BACKGROUND

In communication networks, such as telecommunication networks, a call or a service often involves, on the one hand, a control plane or signalling plane and, on the other hand, a user plane or media plane. The control plane or signalling plane is in charge of establishing and managing a connection between two points on the network. The user plane or media plane is in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber is entitled, or authorized, to enjoy a service, and whether the network can provide the service to the subscriber (and with which quality of service).

Policy and charging control architectures, such as, but not limited to, the architecture described in 3GPP TS 23.203 v8.1.1 (2008-03), Technical Specification Group Services and System Aspects, *Policy and charging control architecture (Release 8)* (available on http://www.3gpp.org/ftp/Specs/2008-03/Rel-8/23_series/), integrate the policy and charging control.

One aim of a policy framework is to set up and enforce rules on a per-subscriber basis to ensure a fair usage of the network resources among all the subscribers, taking into account the specific profile of each subscriber.

It is desirable to provide methods, servers, systems and computer programs to improve policy and charging control architectures and implementations, notably by allowing more flexibility for operators and service providers without increasing the implementation and architecture complexity.

SUMMARY

To meet or at least partially meet the above-mentioned goals, such methods, servers and computer programs are defined in the independent claims. Advantageous embodiments are defined in the dependent claims.

2

In one embodiment, a policy and charging control method is carried out by a server including a policy and charging enforcement function (PCEF). The method includes obtaining, by the server including the PCEF, identification information for identifying a particular service instance of a particular service type. The method further includes receiving, by the server including the PCEF, a packet, and determining, by the server including the PCEF, whether the received packet belongs to the particular service instance. The determination is performed by using the identification information and by inspection of at least one of layer n control information of the packet, wherein n is an integer equal to or larger than 3, and the packet's payload encapsulated by layer 7 control information. The layer level is here understood in the sense of the well-known Open Systems Interconnection (OSI) reference model (but may be translated into other reference models). The method further includes, if it is determined that the packet belongs to the particular service instance, updating, by the server including the PCEF, a usage parameter representing or identifying an accumulated usage associated with the particular service instance. The method then further includes making available, by the PCEF to a policy and charging rules function (PCRF), the usage parameter or information derived from the usage parameter.

The method enables monitoring the usage of the network resources on a per service instance basis. In other words, rather than, or in addition to, monitoring the usage made by a subscriber of the network traffic associated with a service (no matter how many and which instances of the service exist), the method enables the PCEF to monitor the traffic on a per subscriber and per service instance basis. The PCEF does so by inspecting the received packets beyond their physical layer and data link layer attributes.

A policy and charging control method is a method through which a network operator manages the rules to be applied to the users' sessions, or subscribers' sessions, regarding which use of the networks is allowed and which charging rule must be applied to a particular session on the user plane. The method, by enabling monitoring of the traffic by the PCEF on a per service instance basis, also enables information about the accumulated usage of a specific service instance to be transferred to, i.e. reported to, a PCRF for specific processing.

The PCRF is a policy decision element which, notably based on the user profile and on the network conditions, decides which rule has to be enforced in the user plane. In a General Packet Radio Service (GPRS) network for example, the PCRF may be capable of communicating with the Gateway GPRS Support Node (GGSN) to transfer authorization information, so as to be able to control Internet Protocol (IP) bearer resources. The IP bearer enables the user plane transport of IP packets and is capable of carrying many IP flows. The PCRF, which is made aware by the PCEF of information regarding the accumulated usage associated with a particular service instance, may change the rules to be enforced by the PCEF based on the information regarding the usage associated with the particular service instance. This provides a more flexible policy framework.

A PCEF is in charge of enforcing the PCC rules decided by the PCRF. The PCEF enforces the PCC rules in the user plane with respect to a particular session or with respect to a particular service instance.

In one embodiment, the method further includes obtaining, by the PCEF, a usage limit for the particular service instance. This enables the PCEF to make a determination as to when and/or how frequently the usage parameter is to be made available, i.e. reported, to the PCRF. For example, the PCEF, upon determining that the usage associated with a particular service instance has reached 95 percent of the usage limit, or has reached the usage limit minus 5 MB, or has reached the usage limit minus 5 minutes, may be configured to make available, i.e. to report, the usage parameter to the PCRF. The PCRF may then make further determinations and processing based on this reported usage parameter, thus providing improved flexibility in the policy and charging management by network operators.

In one embodiment, the method is such that making available the usage parameter or information derived from the usage parameter includes making available, when the accumulated usage represented or identified by the usage parameter has reached or exceeded the usage limit, an indication that the usage parameter has reached or exceeded the usage limit. The information, i.e. the indication that the usage parameter has reached or exceeded the usage limit, may then be used by the PCRF to make determinations and decisions accordingly, such as changing rules to be enforced by the PCEF.

The method may further be carried out by a server including the PCRF, and the method may further include obtaining, by the PCRF, the usage parameter or information derived from the usage parameter. The PCRF may then determine, based on the usage parameter or information derived from the usage parameter, new policy and charging rules to be enforced. The new policy and charging rules to be enforced may then be made available, by the PCRF, and obtained accordingly, by the PCEF.

In one embodiment, a policy and charging control method is carried out by a server including a PCRF. The method includes obtaining, by the PCRF, identification information for identifying a particular service instance of a particular service type. The method further includes determining, by the PCRF, a usage limit for the particular service instance. The PCRF then makes available, to a PCEF, identification information for identifying the particular service instance and the usage limit associated with the particular service instance.

This embodiment enables the PCRF to determine a particular usage limit to be used by the PCEF for monitoring the usage in relation to the particular service instance and reporting it back to the PCRF. The identification information for identifying a particular service instance of a particular service type is provided by the PCRF to the PCEF to enable the PCEF to detect which of the received packets are associated with the particular service instance, so that the usage parameter can be properly updated. The usage limit is provided by the PCRF to the PCEF to enable the PCEF to decide when to report the usage parameter to the PCRF.

In one embodiment, a policy and charging control method is carried out by a server including an application function (AF). The method includes receiving, by the AF, a packet. The method further includes determining, by the AF, whether the received packet corresponds to a start condition (i.e., activation) in relation to a particular service instance of a particular service type. The determination is performed by the AF by inspection of at least one of layer n control information of the received packet, wherein n is an integer equal to or larger than 3, and the received packet's payload encapsulated by layer 7 control information. As already mentioned above in relation to another embodiment, the layer level is understood in the sense of the well-known Open Systems Interconnection (OSI) reference model. The method further includes, if it is determined by the AF that the packet corresponds to a start condition, making available, by the AF to a PCRF, identification information for identifying the particular service instance.

An AF enables the PCRF to obtain application level session information, such as, but not limited to, service requirements, as input for the policy decision process. The AF is part of the control plane. In the present embodiment, the AF is capable of detecting the initiation of a particular service instance of a service type and is further capable of informing the PCRF accordingly. The AF provides the PCRF with sufficient information so that the PCRF can make a decision regarding the policy and charging rules to be enforced by the PCEF in the light of the initiation of the newly detected particular service instance of the service type. Information to enable to PCEF to identify packets associated with the particular service instance of the service type is also provided to the PCRF so that this information can be forwarded to the PCEF. Such information may also be forwarded directly from the AF to the PCEF, i.e. without transiting through the PCRF, to the extent that the PCRF nevertheless receives sufficient information regarding the initiation of the particular service instance of the service type so that the PCRF is capable of setting up appropriate rules in the light of the initiation of the newly detected particular service instance of the service type.

In one embodiment, a method is carried out by an AF, a PCRF and a PCEF. The method includes the steps of the policy and charging control method carried out by a server including the AF as mentioned above, the steps of the policy and charging control method carried out by the PCRF as mentioned above, as well as the steps of the policy and charging control method carried out by a server including the PCEF as mentioned above (including the step of obtaining a usage limit for the particular service instance). The identification information made available by the AF is the identification information that is obtained by the PCRF, while the identification information and the usage limit made available by the PCRF are the identification information and the usage limit that are obtained by the PCEF.

In other words, in this embodiment, the AF receives a packet. The AF determines whether the received packet corresponds to a start condition in relation to a particular service instance of a particular service type. The determination is performed by inspection of the received packet, as mentioned above. If the AF has determined that the packet corresponds to a start condition (i.e., if the AF has determined that a service instance has been started), the AF makes available identification information for identifying the particular service instance to the PCRF. The PCRF determines a usage limit for the particular service instance (based for example on any type of predetermined rules set up by an operator) and then makes available, to the PCEF, the identification information for identifying the particular service instance and the usage limit associated with the particular service instance. Upon receiving a packet, the PCEF determines whether the received packet belongs to the particular service instance. The determination is performed by using the identification information and by inspection as explained above. If the packet is determined by the PCEF to belong to the particular service instance, the PCEF updates a usage parameter representing or identifying an accumulated usage associated with the particular service instance. The usage parameter or information derived from the usage parameter is then made available by the PCEF to the PCRF.

In this manner, the usage of a particular service instance may be monitored and policy and charging rules may be dynamically set up and enforced based on the service instance usage evolution. This enables new and more flexible policy and charging control applications to be created and provisioned.

In one embodiment, the method further includes determining, by the AF, whether the received packet corresponds to a change condition in relation to a particular service instance (wherein a change condition may for example be a modification of a property of the particular service instance). If it is determined that the packet corresponds to a change condition, the AF makes available to the PCRF an indication of this change condition (the PCRF therefore obtains the indication). The PCRF then determines at least one of a new usage limit for the particular service instance and new policy and charging rules to be enforced. The PCRF then makes available to the PCEF the at least one of new usage limit for the particular service instance and new policy and charging rules to be enforced, respectively.

This enables a change in relation to a particular service instance (such as for example, in a telephone conference, a person joining or leaving the telephone conference) to be taken into account by the PCRF for dynamically setting up policy and charging rules to be enforced by the PCEF. This also enables new and more flexible policy and charging control applications to be created and provisioned.

In one embodiment, the method further includes determining, by the AF, whether the received packet corresponds to a stop condition in relation to a particular service instance.

If it is determined by the AF that the packet corresponds to a stop condition, the AF makes available, to the PCRF, an indication of this stop condition, and the PCRF therefore obtains the indication. The PCRF then sends to the PCEF instructions to stop using the identification information for identifying the particular service instance in relation to which a stop condition has been identified and to stop updating a usage parameter for the particular service instance. This enables to PCRF to cause the PCEF to discontinue and deconfigure the usage monitoring and reporting in relation to the particular service instance.

In one embodiment, the method further includes determining, by the AF, an inspection rule for inspecting a packet to determine whether the packet belongs to the particular service instance. If the AF and PCEF are hosted on different servers, the AF may make available the inspection rule directly to the PCEF. Alternatively, the AF may make available the inspection rule to the PCEF through the PCRF. The inspection of received packets to determine whether they belong to a particular service instance is later performed by the PCEF according to the inspection rule.

The invention also relates to a server configured for implementing a PCEF, to a server configured for implementing a PCRF, and to a server configured for implementing an AF, as defined in the claims. The servers are configured to participate in and implement the above-described methods, and their particular embodiments.

The invention also relates to systems and computer programs as defined in the claims.

BRIEF DESCRIPTION OF THE DRAWINGS

Embodiments of the present invention shall now be described, in conjunction with the appended figures, in which:

FIGS. 22a to 22d and 23 to 26 illustrate four methods in embodiments of the invention.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
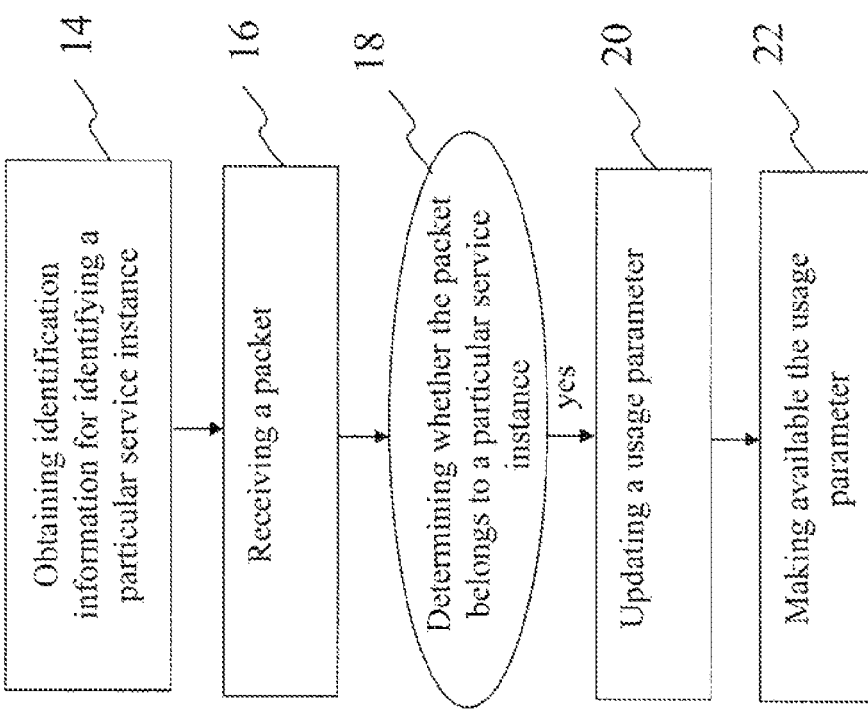
FIG. 1 is a flowchart of a method in one embodiment of the invention, wherein the method is carried out by a server including a PCEF.

FIG. 1 schematically illustrates a method in one embodiment of the invention. The method is carried out by a PCEF.

The PCEF obtains 14 identification information for identifying a particular service instance of a particular service type. In other words, the information is suitable to be used, possibly along with defined inspection rules associated with some service types and/or packet formats, by the PCEF to determine whether a particular packet belongs to a particular service instance of a service type or not. The identification information may be for example obtained from a PCRF or from an AF.

The PCEF then receives 16 a packet. The packet may for example be an Internet Protocol (IP) packet or another type of packet. The packet is transferred in the user plane.

The PCEF determines 18 whether the packet belongs to the particular service instance identified by the identification information. The PCEF does so by using the identification information obtained in step 14 and by deep inspecting the received packet. "Deep inspection" (or "deep inspecting", "deeply inspecting", or "deep packet inspection") means in this embodiment that at least the control information of OSI layer 3 or more of the received packet is inspected, and/or the packet's payload encapsulated by control information of OSI layer 7. In other words, the PCEF inspects the received packets beyond their physical layer and data link layer attributes. By inspecting at least the control information of OSI layer 3 or more of the received packet, specific information such as, but not limited to, the source and destination IP addresses of the packet may be retrieved by the PCEF. The PCEF may do so in particular by retrieving or detecting a particular attribute of one control field (e.g., header) of layer 3 or more of the received packet and/or by inspecting the payload of the received packet (the actual application layer data). A specific parsing rule, possibly with service instance specific character or bit strings to be detected, may be identified by or included in the identification information to enable the deep inspection to be carried out.

The implementation of the detection of a particular service instance by deep inspection (i.e., determining 18 whether the packet belongs to a particular service instance, as mentioned above) may depend on the service and protocol concerned. For example, for Real Time Streaming Protocol (RTSP) packets, a control field to be checked may be the RTSP.PLAY URL, whereas, for Session Initiation Protocol (SIP) packets, it may be the Call Identifier in the SIP INVITE. A skilled person would be able to implement proper rules (e.g. parsing rules) to determine whether a packet belongs to a particular service instance. As mentioned above, for example, for RTSP, the control field to be checked may be the RTSP.PLAY URL, while for SIP it may be the Call Identifier in the SIP INVITE. In the special case where the relevant control fields are encrypted however, detecting the particular service instances may not be possible.

If the PCEF determines in step 18 that the received packet belongs to the particular service instance, the PCEF updates 20 a usage parameter representing or identifying an accumulated usage associated with the particular service instance. In other words, the usage is accumulated and the result of the accumulation is stored in memory.

Then the PCEF makes available 22, to a PCRF, the usage parameter or information derived from the usage parameter.

Throughout the present document, that a step is carried out by a server including a PCEF and that a step is carried out by the PCEF are used interchangeably and both mean that the PCEF function implemented on the server performs the step so that the server can also be said to perform the step. The same applies for the steps performed by the PCRF or AF, and the like.

The accumulated usage may be an amount of transferred data, a lapse of time (during which the service instance is active, or since the service instance has been started), a number of encountered events, or any other metrics accounting for the duration or intensity of use of a service instance.

In one embodiment, "deep inspection" means that at least the control information of OSI layer 5 or more of the received packet is inspected, and/or the packet's payload encapsulated by control information of OSI layer 7.

In one embodiment, "deep inspection" means that at least the control information of OSI layer 7 of the received packet is inspected, and/or the packet's payload encapsulated by control information of OSI layer 7.

One advantage of embodiments of the invention is that it is not necessary to adapt the format of the user plane packets to ensure that the particular service instance associated with a packet can be detected. Adapting the format of the user plane packets such as marking the packets with different code per service instance would rely on the user equipements having a functionality which is disadvantageous to have in user equipements (old/legacy UEs, requirements on minimum user equipement functionality due to battery life, etc). In embodiments of the invention, the intelligence is In the network thanks to the detection the particular service instances using DPI technology.

Figure 2:
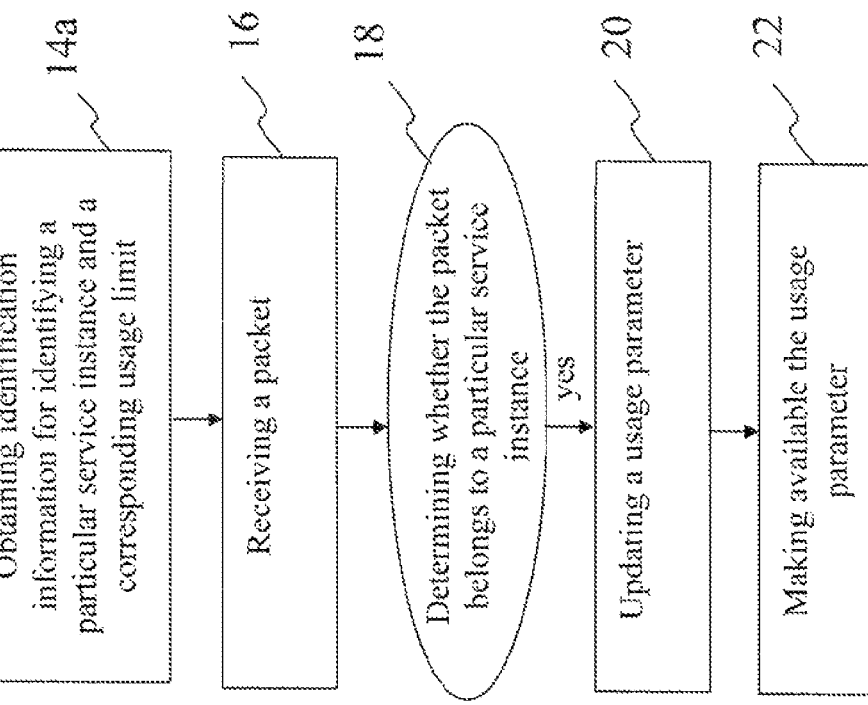
FIG. 2 is a flowchart of a method in one embodiment of the invention, which differs from the method illustrated in FIG. 1 in that a usage limit in relation to the service instance is further obtained by the PCEF.

FIG. 2 schematically illustrates a method in one embodiment of the invention. The method is carried out by a PCEF. The method differs from the method illustrated in FIG. 1 in that, besides obtaining 14 identification information, the PCEF also obtains 14a a corresponding usage limit, i.e. a usage limit corresponding to the particular service instance. Thereafter, the PCEF may use the usage limit, or quota, to decide when to make available (i.e., to report) the accumulated usage parameter to the PCRF. The PCEF may for example make available the accumulated usage parameter when the usage parameter has reached or exceeded the usage limit, but other embodiments are possible. For example, when the accumulated usage approaches the usage limit, the PCEF may report the parameter to the PCRF.

Figures 3, 4:
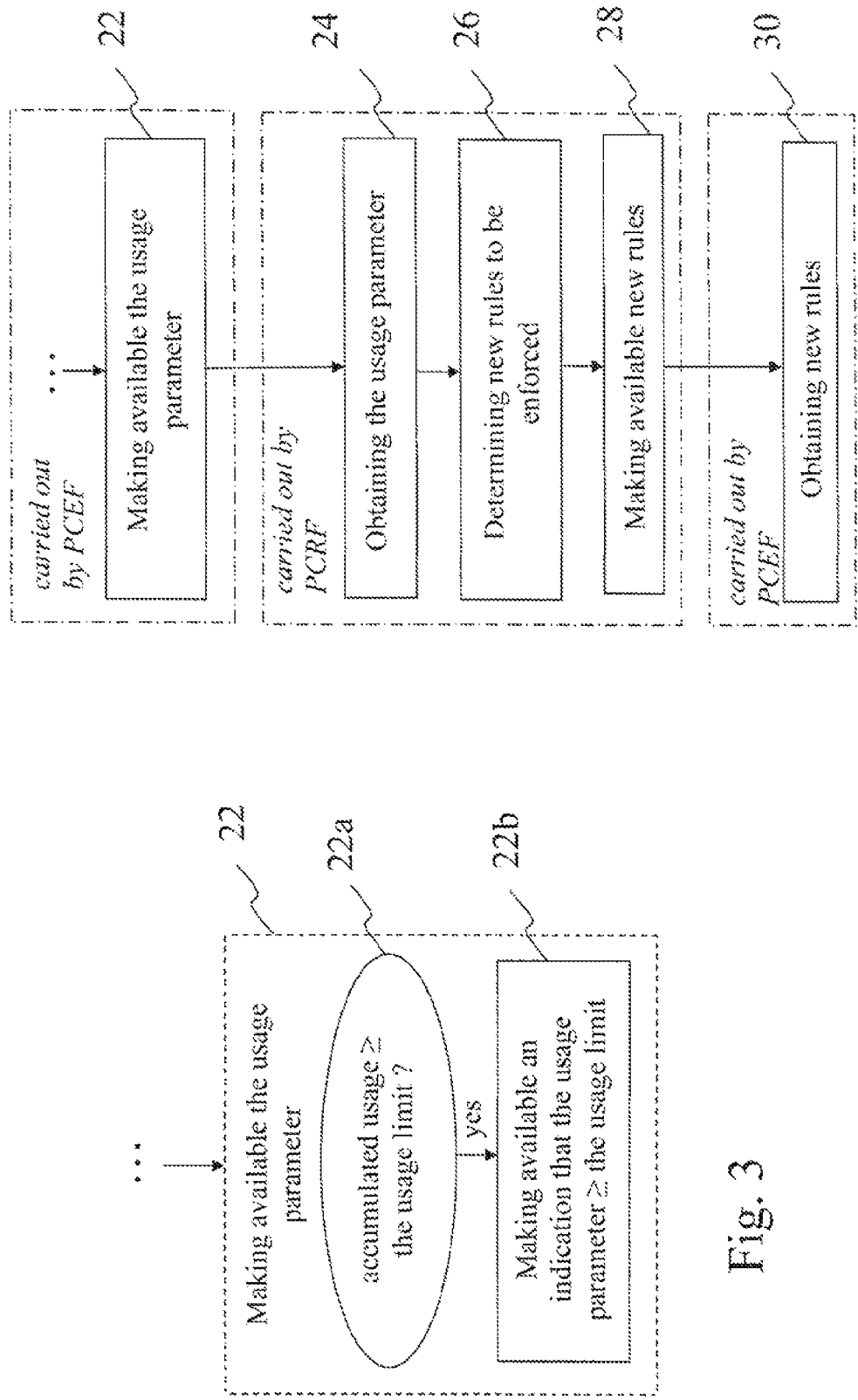
FIG. 3 is a flowchart of a portion of a method in one embodiment of the invention, wherein the usage parameter is made available if the accumulated usage has reached or exceeded the usage limit.
FIG. 4 is a flowchart of a portion of a method in one embodiment of the invention, showing steps performed by a PCRF and the PCEF after making available by the PCEF the usage parameter to the PCRF.

FIG. 3 schematically illustrates a portion of a method in one embodiment of the invention. This portion of the method is carried out by a PCEF, and details a possible implementation of the step of making available 22 the usage parameter as illustrated in FIG. 2. Namely, based on the usage limit obtained in step 14a (as illustrated in FIG. 2), the PCEF determines 22a whether the accumulated usage of the particular service instance has reached or exceeded the usage limit. If so ("yes" in FIG. 3), the PCEF makes available 22b the usage parameter to the PCRF for further processing.

FIG. 4 schematically illustrates a portion of a method in one embodiment of the invention. The method is carried out by a PCEF and by a PCRF. After steps 14 (or 14a), 16, 18 and 20 as illustrated in FIG. 1, 2 or 3, further steps are performed. The ellipsis "..." in FIG. 4 represents these steps 14 (or 14a), 16, 18 forming part of the method of FIG. 4 but not illustrated in FIG. 4 for the sake of convenience. After the PCEF has made available 22 the usage parameter or a parameter derived therefrom to the PCRF, the PCRF obtains 24 the usage parameter associated with a particular service instance. The PCRF then determines 26 new policy and charging rules to be enforced by the PCEF. The determination 26 by the PCRF of the new rules is made based on the usage parameter, i.e. on its value(s), whether the accumulated usage has reached or exceeded a particular usage limit, threshold or quota, whether the usage approaches a particular value, or the like.

The new policy and charging rules determined 26 by the PCRF are then made available 28 to the PCEF and obtained 30 by PCEF, which is then configured to enforce these new rules. This method enables a dynamic provisioning of policy and charging rules on a per service instance basis.

In one embodiment, the usage monitoring is carried out on a per service instance and the new policy and charging rules determined 26 by the PCRF, and the policy enforcement of the rules by the PCEF, are also carried out on a per service instance. In another embodiment, the usage monitoring is carried out on a per service instance, while the new policy and charging rules determined 26 by the PCRF, and the policy enforcement of the rules by the PCEF, are carried out on a per service type for all service instances concerned, for example at the bearer or PDP context level.

Figure 5:
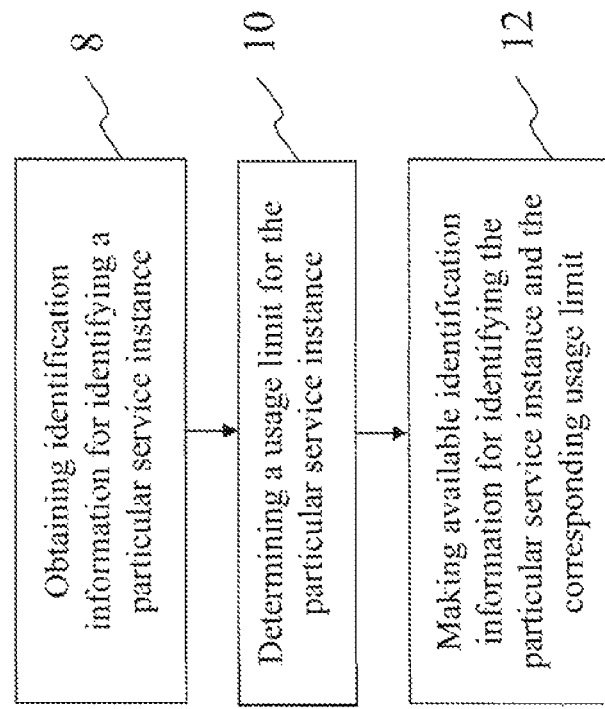
FIG. 5 is a flowchart of a method in one embodiment of the invention, wherein the method is carried out by a server including a PCRF.

FIG. 5 schematically illustrates a method in one embodiment of the invention. The method is carried out by a PCRF. The PCRF first obtains 8 identification information for identifying a particular service instance. Based on the obtained identification, the type of service, the subscriber for whom the service is executed or will be executed, the subscriber's profile, configured rules set up by an operator in the PCRF, etc, the PCRF determines 10 a usage limit for the particular service instance. The usage limit is then made available 12 by the PCRF along with the identification information for identifying the particular service instance, in order for a PCEF to be able to monitor the usage of the service instance and report the usage when the usage limit approaches, is reached or is exceeded.

Figure 6:
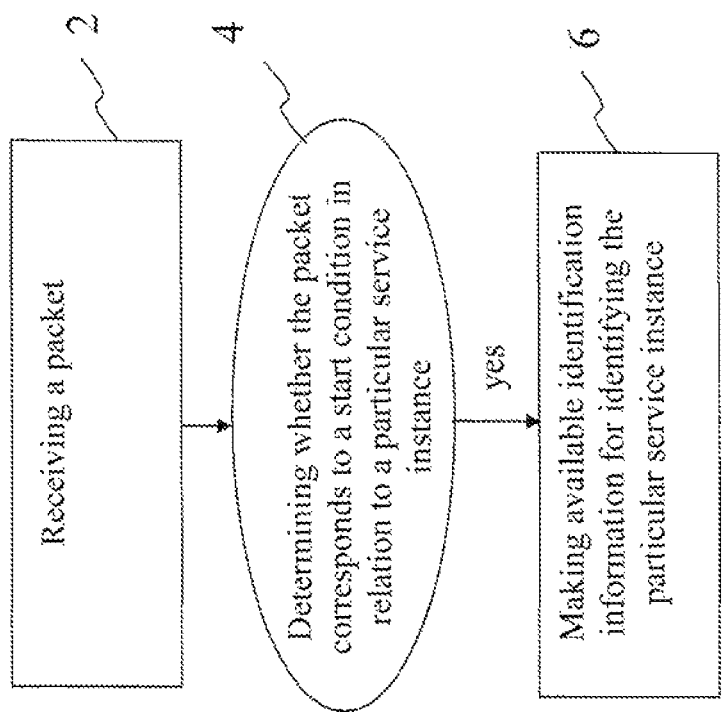
FIG. 6 is a flowchart of a method in one embodiment of the invention, wherein the method is carried out by a server including an AF.

FIG. 6 schematically illustrates a method in one embodiment of the invention. The method is carried out by an AF. The AF receives 2 a packet. The AF, including a deep inspection engine (i.e. software capabilities for realizing deep inspection), determines 4 whether the packet corresponds to a start condition in relation to a particular service instance. This may for example corresponds to starting to play a particular movie, initiating a particular voice over IP (VoIP) call, a particular teleconference, etc. If so, the AF makes available 6 identification information for identifying the particular service instance. Such identification information may be used by a PCRF to determine corresponding rules to be enforced in the user plane and a usage limit after which the accumulated usage of the particular service instance is expected to be reported by the PCEF to the PCRF.

Figure 7:
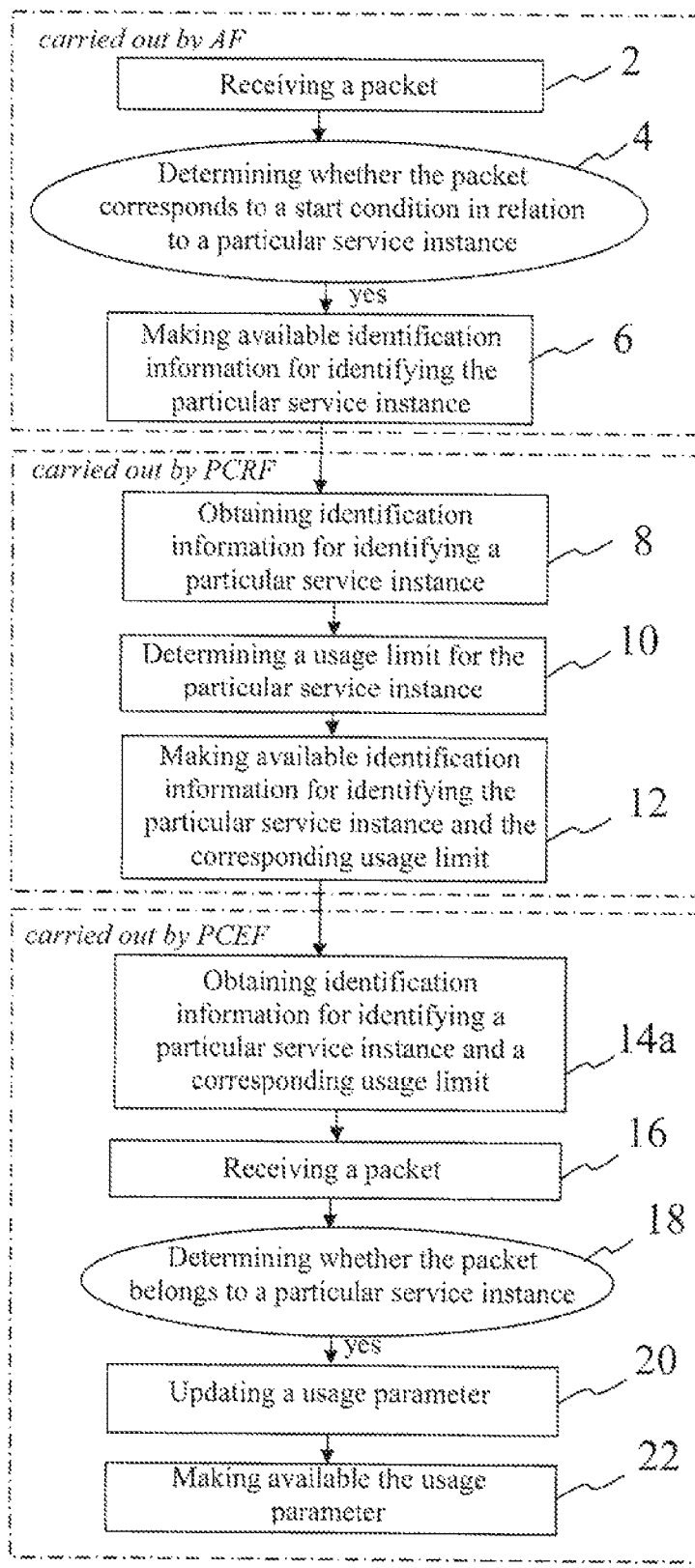
FIG. 7 is a flowchart of a method in one embodiment of the invention, wherein the method is carried out by an AF, a PCRF and a PCEF.

FIG. 7 schematically illustrates a method in one embodiment of the invention. This method is carried out by an AF, a PCEF and a PCRF. First, steps 2, 4, 6 illustrated and described with reference to FIG. 6 are carried out by the AF. Then, the identification information for identifying a particular service instance is transferred 6, 8 from the AF to the PCRF. The PCRF then carries out steps 8, 10, 12 as illustrated and described with reference to FIG. 5. Then, the identification information for identifying a particular service instance along with the usage limit determined by the PCRF are transferred 12, 14a from the PCRF to the PCEF. The PCEF then carries out steps 14a, 16, 18, 20, 22 as illustrated and described with reference to FIG. 2. The full set of steps enables the detection, by an AF, of the initiation of a particular service instance, the determination, by the PCRF, of a usage limit for this particular service instance, and the reporting, by the PCEF, of the accumulated usage per service instance once the usage limit approaches, or has been reached or exceeded.

If, for example, a particular first call is active with a low QoS and if the subscriber initiates a second call as part of a promoted service trial (proposed by an operator), the QoS for the second service instance (i.e. the second call in this example) associated with the promoted service trial may be subject to different policy and charging rules than those associated with the first call. The higher QoS enforced for the second call may also be limited as to its usage, for example regarding the duration of the call (lapse of time), the volume of data transferred during the call (amount of data), or the number of persons joining the call (number of events).

Figure 8:
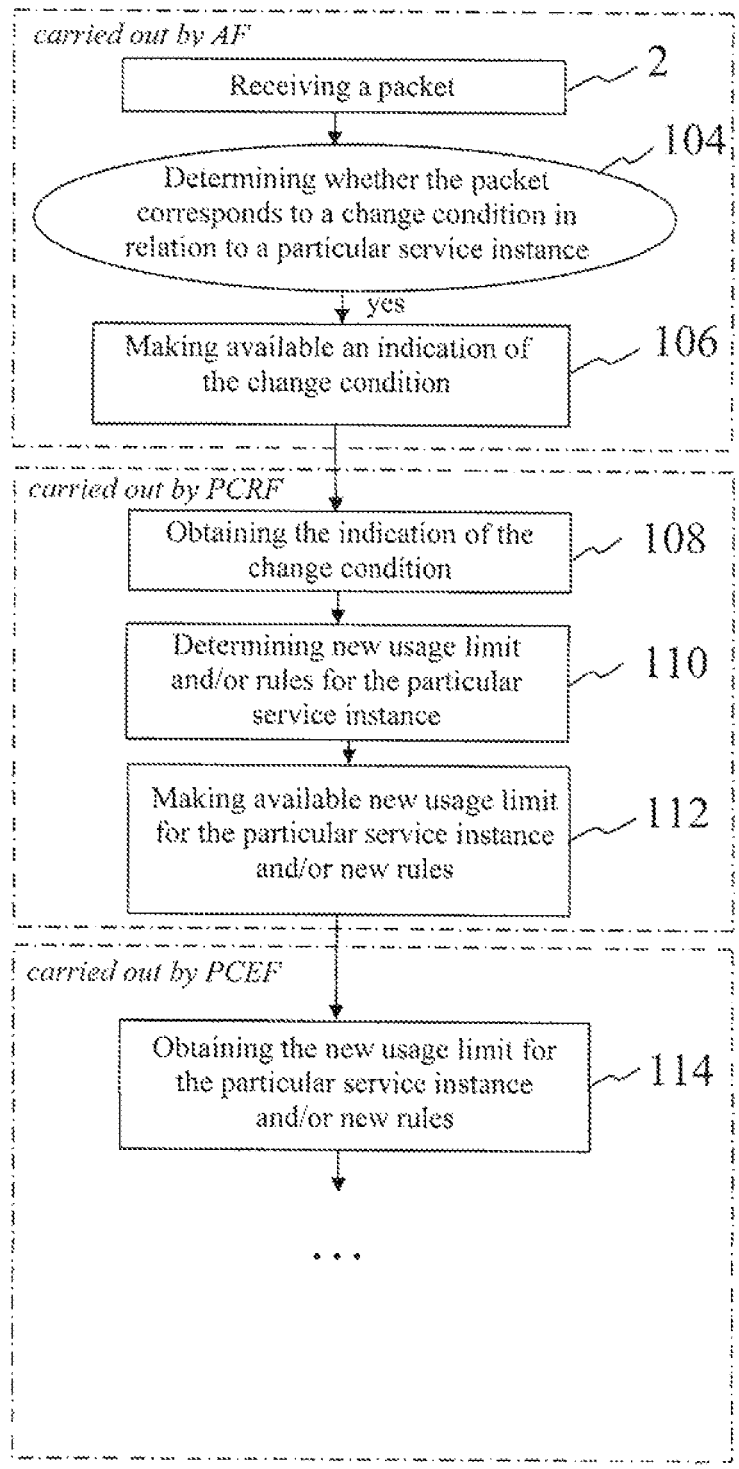
FIG. 8 is a flowchart of a method in one embodiment of the invention, wherein the AF further determines whether a received packet corresponds to a change condition in relation to a particular service instance.

FIG. 8 schematically illustrates further steps of a method in one embodiment of the invention, which may be carried out after the steps illustrated in FIG. 7. Namely, the AF receives 2 a packet, determines 104 whether the packet corresponds to a change condition in relation to a particular service instance, and, if so, the AF makes available 106 to the PCRF an indication of the change condition. The PCRF obtains 108 the indication and determines 110 at least one of a new usage limit and/or new rules for the particular service instance, depending notably on the nature of the change, the subscriber's profile, configured rules in the PCRF, etc. For example, if during a video conference an additional participant joins the conference, the PCRF may change the QoS rules to be enforced as a result of the change (for example to cope with the additional participant and still allow exercising a fair usage policy scheme) or may change the usage limit pursuant to which the PCEF is expected to report the usage parameter to the PCRF. The new usage limit for the particular service instance and/or the new policy and charging rules are made available 112 from the PCRF to the PCEF, which obtains 114 them. Steps 16, 18, 20, 22 may then be carried out (as already described) by the PCEF as illustrated by the ellipsis " . . . " in FIG. 8.

Figure 9:
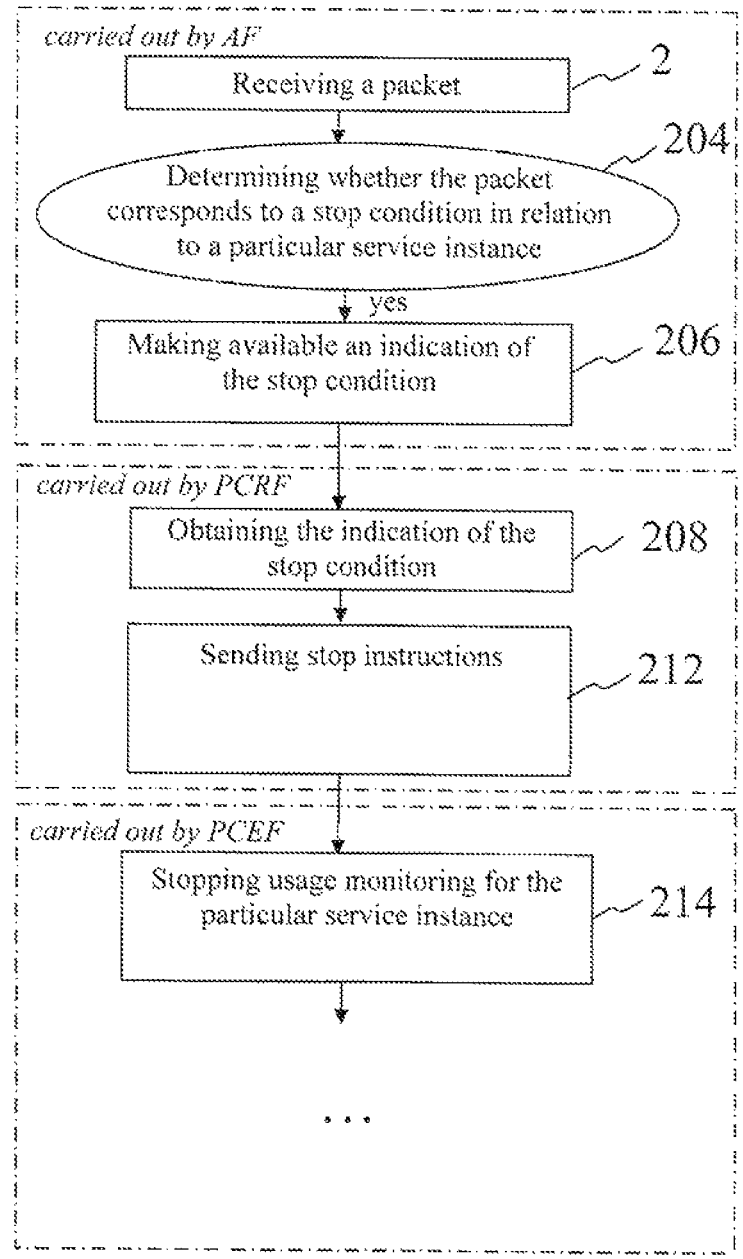
FIG. 9 is a flowchart of a method in one embodiment of the invention, wherein the AF further determines whether a received packet corresponds to a stop condition in relation to a particular service instance.

FIG. 9 schematically illustrates further steps of a method in one embodiment of the invention, which may be carried out after the steps illustrated in FIG. 7 and/or after the steps illustrated in FIG. 8. Namely, the AF receives 2 a packet, determines 204 whether the packet corresponds to a stop condition in relation to a particular service instance, and, if so, the AF makes available 206 to the PCRF an indication of the stop condition. The PCRF obtains 208 the indication and sends 212 to the PCEF instructions to stop using the identification information for identifying the particular service instance in relation to which a stop condition has been identified and to stop updating a usage parameter for the particular service instance. The PCEF obtains 214 the instructions and, accordingly, the PCEF discontinues the use of the identification information for identifying the particular service instance in relation to which a stop condition has been identified and discontinues the update of a usage parameter for the particular service instance. The ellipsis " . . . " in FIG. 9 represents the continued operations of the PCEF in relation to other service instances.

Optionally, after a particular service instance has stopped, the PCEF may also be instructed by the PCRF to change the rules to be enforced for the service type to which the stopped particular service instance belonged. For example, after a particular movie has been streamed and watched as part of a promotion with a particularly high QoS (to exemplify the level or quality of service that a subscriber may obtain by upgrading its contract with an operator or by buying an appropriate voucher), the new rules to be enforced for other movies (currently playing or future) may correspond to different QoS than before.

Thus, the policy and charging framework offers more flexibility for the operator to offer services particularly adapted to the subscriber and the service instance at hand.

Figure 10:
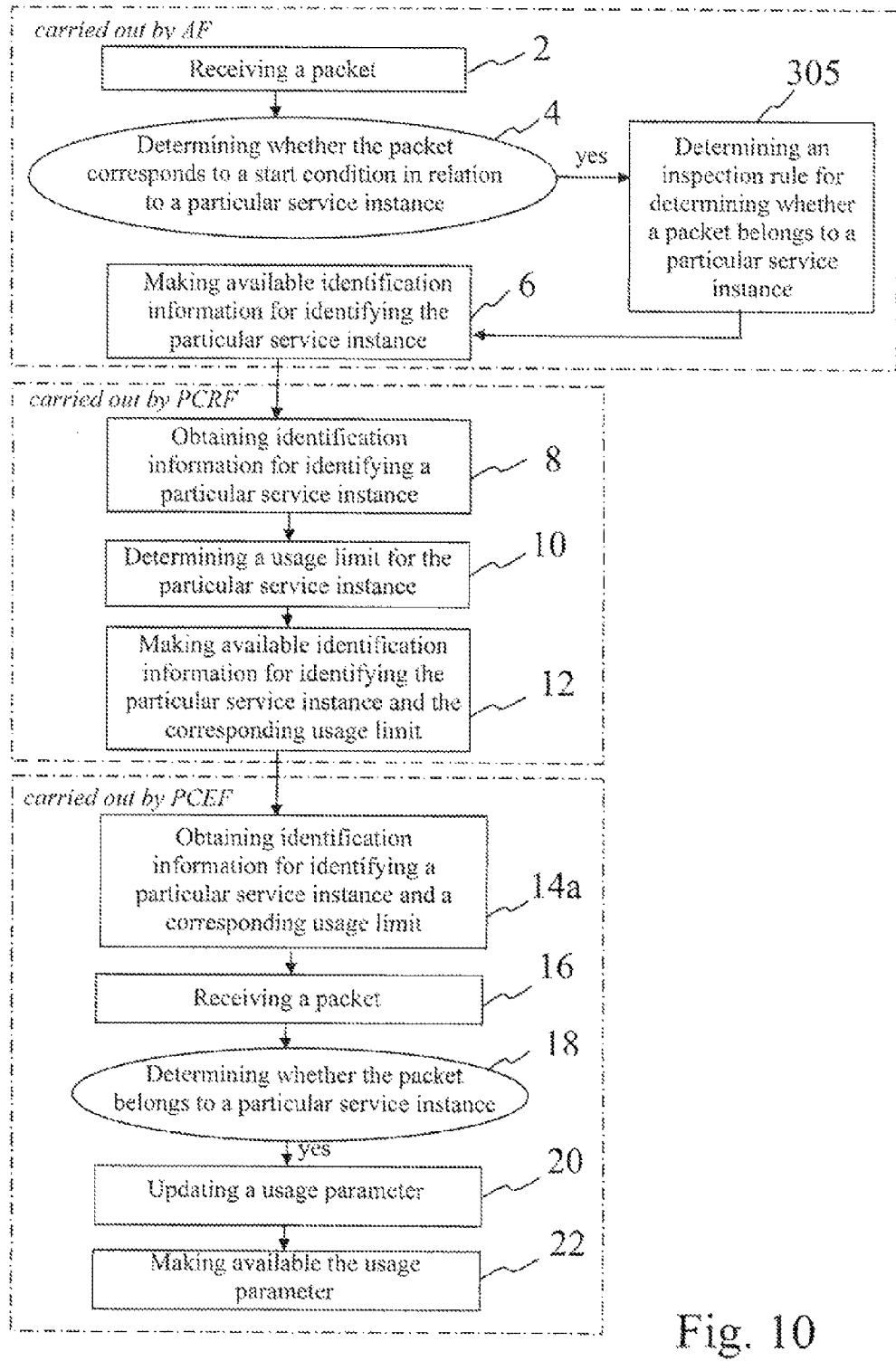
FIG. 10 is a flowchart of a method in one embodiment of the invention, wherein the AF further determines an inspection rule corresponding to a particular service instance.

FIG. 10 schematically illustrates a method in one embodiment of the invention. This method is carried out by an AF, a PCEF and a PCRF, and differs from the method illustrated and described with reference to FIG. 7 in that, after the AF determines 4 whether the received packet corresponds to a start condition in relation to a service instance, and, if the determination result is positive, the AF determines 305 an inspection rule for determining whether a received packet belongs to a particular service instance. Then, the identification information for identifying the particular service instance is made available 6 by the AF to the PCRF.

The inspection rule determined 305 by the AF may either be transmitted through the PCRF to the PCEF or be transmitted directly to the PCEF without transiting through the PCRF. The specific inspection rule is indeed generally not required for proper operation of the PCRF, because the PCRF is generally not configured to receive any packets in the user plane (but the PCRF nevertheless needs identification information for identifying the particular service instance to be able to set a proper usage limit). If the AF and PCEF are hosted on the same server, the inspection rule determined by the AF is also available for use by the PCEF and, therefore, it is not necessary to transmit the inspection rule at all.

Figure 11:
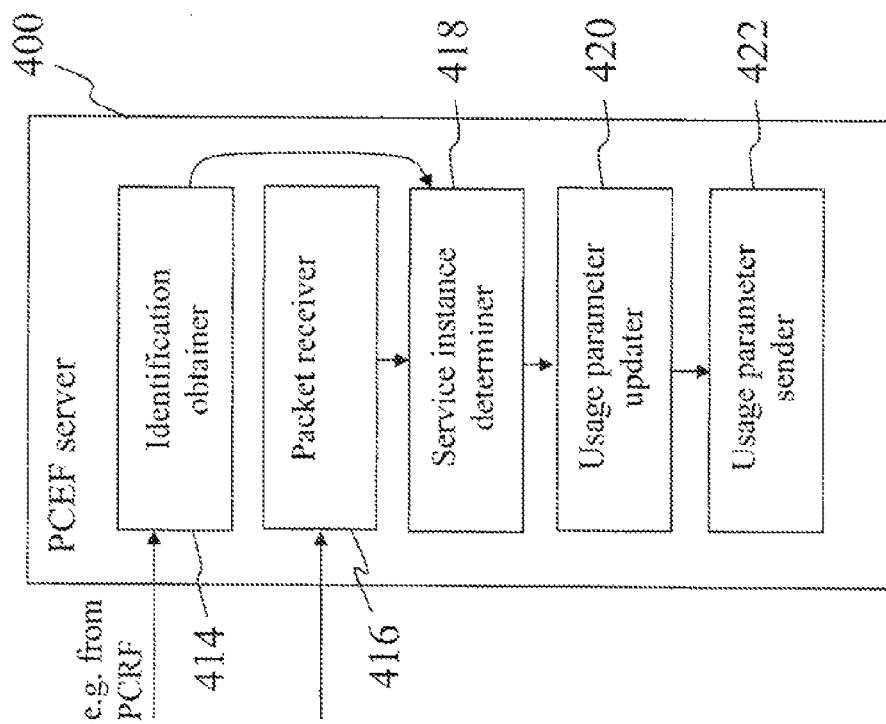
FIG. 11 schematically illustrates a PCEF server in one embodiment of the invention.

FIG. 11 schematically illustrates a PCEF server 400 in one embodiment of the invention. The PCEF server 400 includes at least five units, which may each be implemented for example by pieces of software (computer-understandable instructions) and/or by hardware circuitry. The PCEF server 400 includes an identification obtainer 414, a packet receiver 416, a service instance determiner 418, a usage parameter updater 420, and a usage parameter sender 422.

The identification obtainer 414 is configured for obtaining identification information for identifying a particular service instance of a service type. The PCEF server 400 is configured for storing the identification information and for updating a usage parameter associated with the service instance identified by the identification information whenever a received packet is determined to belong to the service instance. A plurality of pieces of identification information may be stored in the PCEF server 400, wherein each one of the pieces of identification information identifies a different service instance for which a usage parameter has to be updated (i.e., maintained) when a packet associated with the service instance is encountered, i.e. received. The inspection rule used for determining whether a packet belongs to a particular service instance may be, or may be included in, the identification information itself, may be derivable by the PCEF server 400 from the identification information, or may be additionally provided to the PCEF server 400 and stored thereon.

The packet receiver 416 is configured for receiving a packet. The service instance determiner 418 is then configured for determining whether the received packet belongs to a particular service instance by using the identification information and by inspecting the received packet. In particular, the service instance determiner 418 of the PCEF server 400 has a deep packet inspection (DPI) engine to analyze or parse the received packet to determine whether it belongs to a particular service instance. One or more control field of OSI layer 3 or higher is read and/or the payload encapsulated with the control field of OSI layer 7 (the application layer payload) is read in order to determine whether the packet belongs to a particular service instance identified by the identification information. This may include the detection of a particular string of characters, a particular string of bits, and/or a particular combination or patterns of strings or bits in a particular position within the control field(s) (such as headers) or within the payload of the received packets.

The usage parameter updater 420 is configured for updating a usage parameter stored in, or accessible by, the PCEF server 400. The usage parameter represents or identifies an accumulated usage associated with the service instance.

The usage parameter sender 422 is configured for making available, to a PCRF, the usage parameter or information derived from the usage parameter. The usage parameter sender 422 may be configured to make available the usage parameter or information derived from the usage parameter periodically, or when a particular event takes place, such as for example when the accumulated usage represented by the usage parameter approaches, reaches or exceeds a quota or usage limit.

The arrow reaching the identification obtainer 414 of the PCEF server 400, as illustrated in FIG. 11, schematically illustrates that the identification information may be received by the PCEF server 400 from an external entity, for example from a PCRF. The arrow reaching the packet receiver 416 of the PCEF server 400, as illustrated in FIG. 11, schematically illustrates that a packet may be received, in operation, by the PCEF server 400 from an external entity in the user plane. The arrows from the identification obtainer 414 and the packet receiver 416 schematically illustrate that the service instance determiner 418 uses the identification information and the received packet to carry out its corresponding determination.

Figure 12:
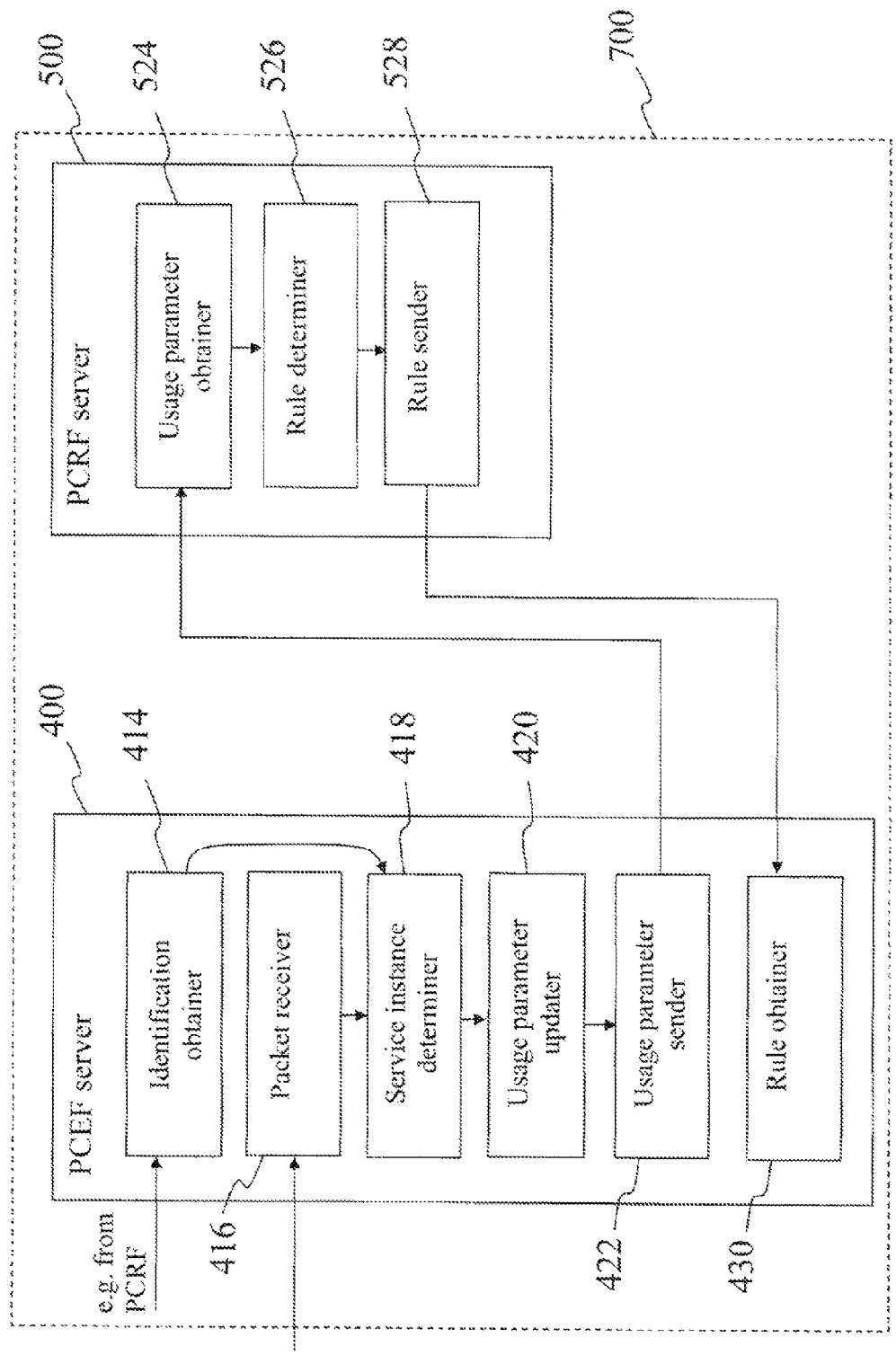
FIG. 12 schematically illustrates a system including a PCEF server and a PCRF server in one embodiment of the invention.

FIG. 12 schematically illustrates a system 700 including a PCEF server 400 and a PCRF server 500 in one embodiment of the invention.

The PCEF server 400 includes the units illustrated and described with reference to FIG. 11. In addition, the PCEF server 400 also includes a rule obtainer 430 configured for obtaining new policy and charging rules from the PCRF server 500 (once the PCRF server 500 has set up new rules to be enforced as a result of obtaining and examining the usage parameter associated with the service instance).

The PCRF server 500 includes a usage parameter obtainer 524 configured for obtaining, from the PCEF server 500, the usage parameter or information derived from the usage parameter. The rule determiner 526 is configured for determining, based notably on the usage parameter or information derived from the usage parameter, new policy and charging rules to be enforced by the PCEF server 400. These new rules are made available by the rule sender 528 of the PCRF server 500 to the rule obtainer 430 of the PCEF server 400, so that the PCEF server 400 may enforce these new policy and charging rules.

For example, if the usage associated with viewing a particular promoted movie by a subscriber are reached (e.g., 20 minutes are reached), new rules may be set up by the PCRF server 500 for enforcement by the PCEF server 400 (i.e., downgrading the speed of streaming after having exemplified the quality of service to whom the user could subscribe). The subscriber may then be offered the possibility to upgrade his or her contract with the operator to permanently obtain the speed of streaming (or QoS) that was active during the first 20 minutes of streaming of the particular movie (i.e., during the trial).

Figure 13:
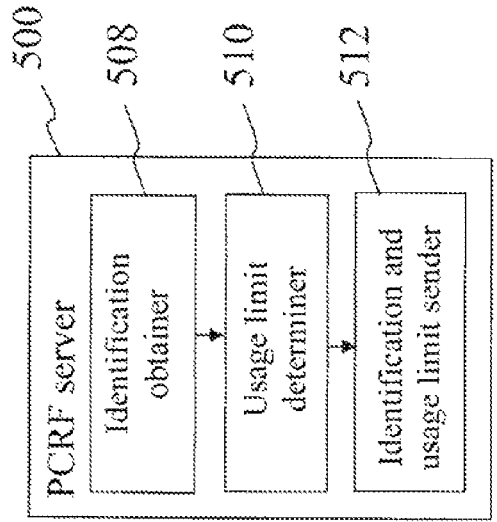
FIG. 13 schematically illustrates a PCRF server in one embodiment of the invention.

FIG. 13 schematically illustrates a PCRF server 500 in one embodiment of the invention. The PCRF server 500 includes at least three units, which may each be implemented for example by pieces of software (computer-understandable instructions) and/or by hardware circuitry. The PCRF server 500 includes an identification obtainer 508, a usage determiner 510, and an identification and usage limit sender 512.

The identification obtainer 508 is configured for obtaining identification information for identifying a particular service instance of a service type. The usage limit determiner 510 is configured for determining a usage limit for the particular service instance identified by the identification information. The identification and usage limit sender 512 is configured for thereafter making available, to a PCEF server 400, the identification information and the associated usage limit.

Figure 14:
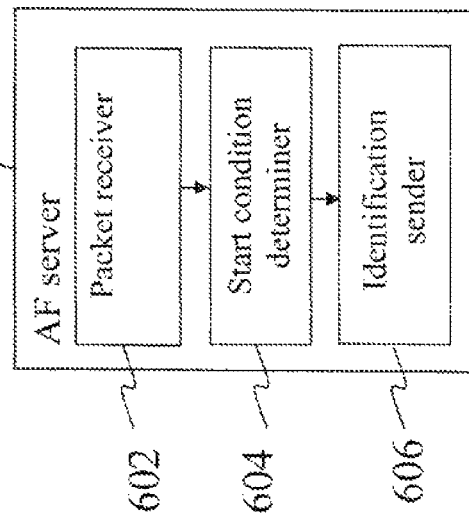
FIG. 14 schematically illustrates an AF server in one embodiment of the invention.

FIG. 14 schematically illustrates an AF server 600 in one embodiment of the invention. The AF server 600 includes at least three units, which may each be implemented for example by pieces of software (computer-understandable instructions) and/or by hardware circuitry. The AF server 600 includes a packet receiver 602, a start condition determiner 604, and an identification sender 606.

The packet receiver 602 is configured for receiving a packet. The start condition determiner 604 is configured for determining whether the received packet corresponds to a start condition in relation to a particular service instance. The start condition determiner 604 is configured to do so by deep inspection of the packet, as already explained above. The identification sender 606 is configured for making available, to a PCRF 500, the identification of the service instance which has been detected to have started.

Figure 15:
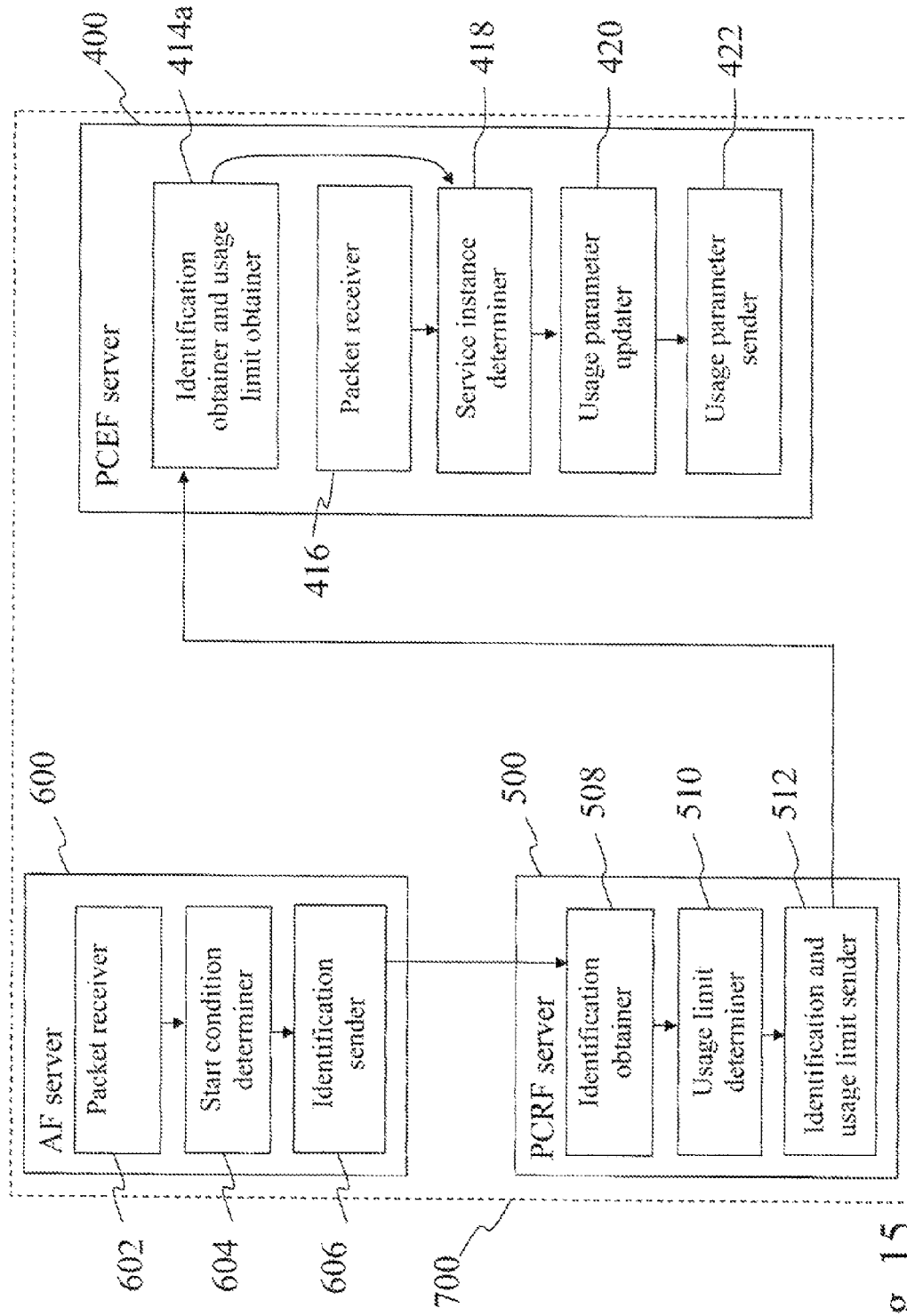
FIGS. 15, 16, 17 and 18 schematically illustrate systems including an AF server, a PCRF server and a PCEF server in embodiments of the invention.

FIG. 15 schematically illustrates a system 700 including an AF server 600, a PCRF server 500 and a PCEF server 400 in one embodiment of the invention.

The AF server 600 includes the units illustrated and described with reference to FIG. 14. The PCRF server 500 includes the units illustrated and described with reference to FIG. 13. The PCEF server 600 includes the units illustrated and described with reference to FIG. 11, except that the PCEF server 600 not only includes an identification obtainer 414 but also includes an usage limit obtainer, forming together an identification obtainer and usage limit obtainer 414a.

When a packet is received by the packet receiver 602 of the AF server 600, the start condition determiner 604 is configured for detecting that a service instance has been initiated. Based on identification information of this service instance, the usage limit determiner 510 of the PCRF server 510 may set a usage limit or quota corresponding to a situation wherein it is expected (i.e., planned) that the policy and charging rules will be required to be adapted. The service instance determiner 418 of the PCEF server 400 detects the user plane packets belonging to the particular service instance and maintains accordingly a parameter representing the accumulated usage of the service instance. Once the usage limit approaches, is reached, or is exceeded, the usage parameter sender 422 of the PCEF server 400 is configured for informing the PCRF server 500 accordingly, so that the policy and charging rules may be adapted, as planned.

Figure 16:
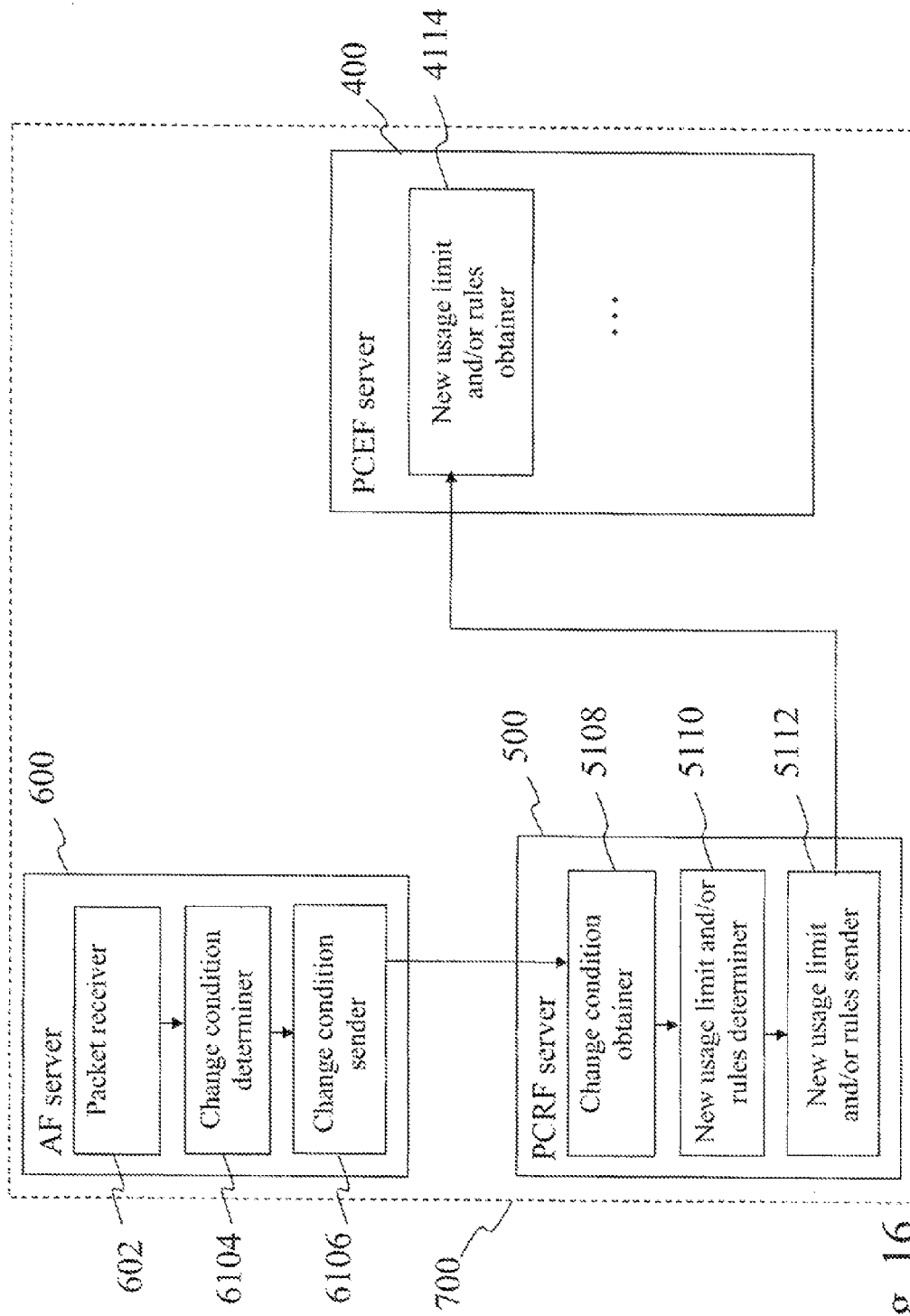

FIG. 16 schematically illustrates a system 700 including an AF server 600, a PCRF server 500 and a PCEF server 400 in one embodiment of the invention. The AF server 600 notably includes a change condition determiner 6104 configured for determining, based on a received packet and by deep inspection of the packet, that a change took place in relation to a service instance (e.g., a property of the service instance has changed). The AF server 600 informs the PCRF server 500 that the change took place using the change condition sender 6106. The PCRF server 500 includes a change condition obtainer 5108 configured for receiving such an indication that a change took place in relation to the particular service instance. A new usage limit and/or new policy and charging rules are then determined by the new usage limit and/or rules determiner 5110 of the PCRF server 500. The new usage limit and/or new policy and charging rules are made available by the new usage limit and/or rules sender 5112 to the PCEF server 400 so that the PCEF server 400 obtains them and, using the new usage limit and/or rules obtainer 4114, can adapt the usage monitoring and/or enforcement of the rules accordingly. The ellipsis " . . . " in FIG. 16 represents the further elements 416, 418, 420, 422 of the PCEF server 400, as illustrated in FIG. 11 but not illustrated in FIG. 16 for the sake of convenience.

Figure 17:
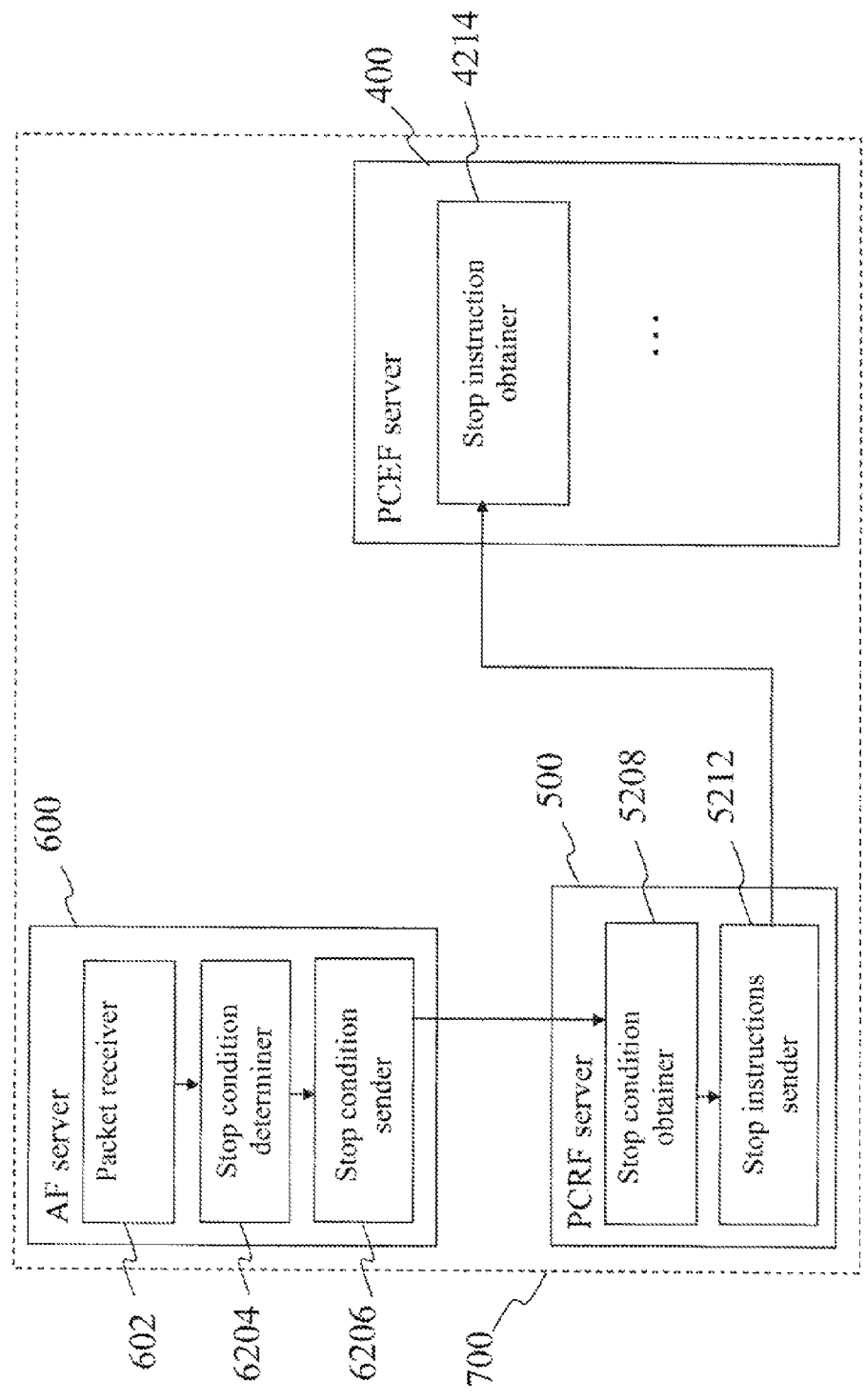

FIG. 17 schematically illustrates a system 700 including an AF server 600, a PCRF server 500 and a PCEF server 400 in one embodiment of the invention. The AF server 600 notably includes a stop condition determiner 6204 configured for determining, based on a received packet and by deep inspection of the received packet, that a stop condition took place in relation to a particular service instance (i.e., the particular service instance ended). The AF server 600 is configured for informing the PCRF server 500 that the stop condition took place using the stop condition sender 6206. The PCRF server 500 includes a stop condition obtainer 5208 for receiving such an indication that a stop condition occurred in relation to a particular service instance. The PCRF server 500 then sends to the PCEF server 400 instructions to stop using the identification information for identifying the particular service instance in relation to which a stop condition has been identified and to stop updating a usage parameter for the particular service instance. In this manner, the PCEF server 400 can discontinue the usage monitoring in relation to the service instance which has ended. Processing and storage resources in the PCEF server 400 can therefore be released accordingly.

Figure 18:
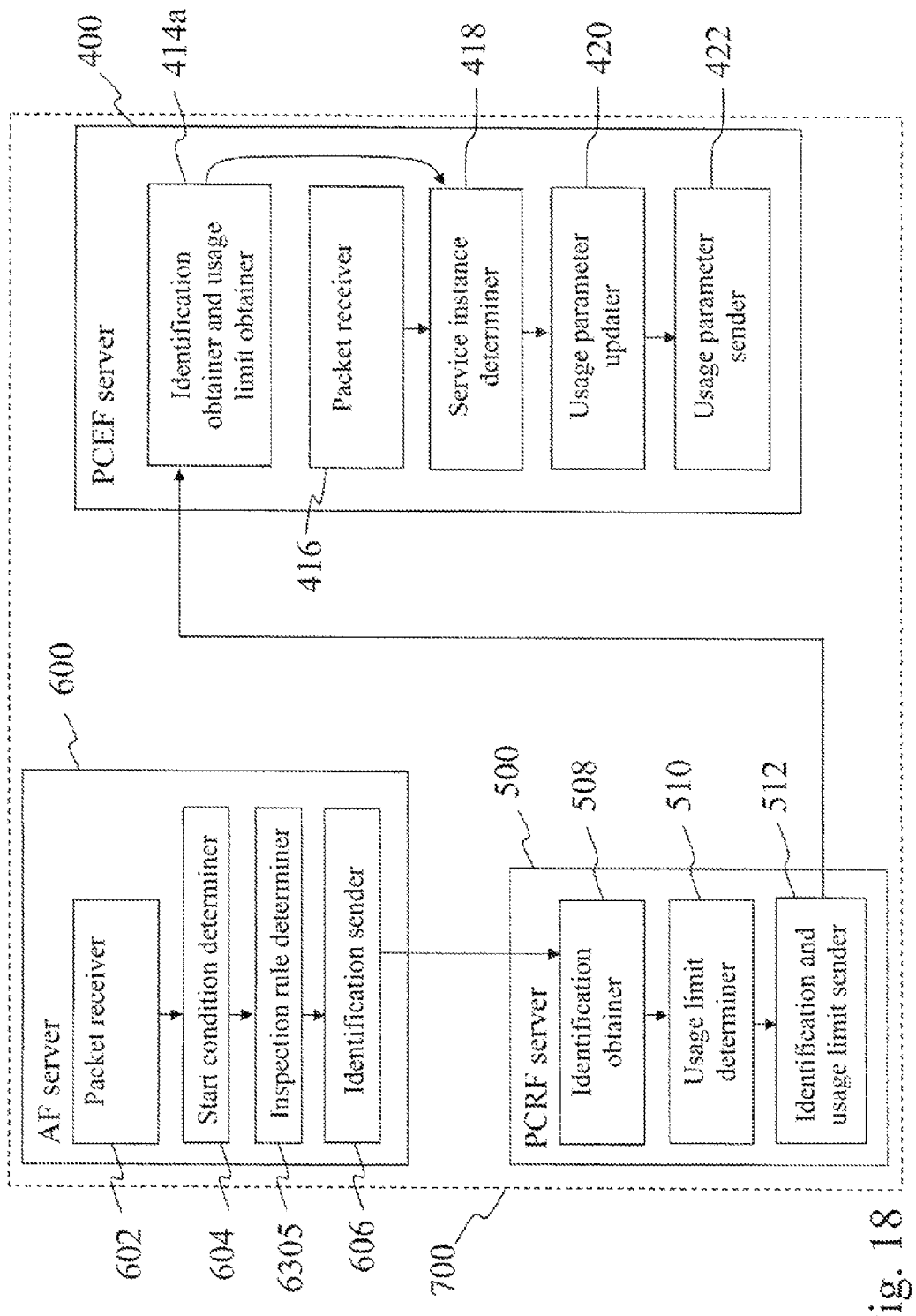

FIG. 18 schematically illustrates a system 700 including an AF server 600, a PCRF server 500 and a PCEF server 400 in one embodiment of the invention. Compared to the system 700 illustrated and described with reference to FIG. 15, the AF server 600 further includes an inspection rule determiner 6305 for determining an inspection rule. This inspection rule is provided (not illustrated in FIG. 18) to the PCEF server 400 in such a manner as to enable the PCEF server 400 to determine 418 whether a received packet belongs to the particular service instance, which start has been detected by the start condition determiner 604 of the AF server 600.

Embodiments of the invention, as described above and later through the description, notably include the following five advantages (non-exhaustive list of advantages).

First, the PCRF 400 may be configured to be capable of dynamically reporting service usage, at the time service instances are detected. This contrasts with systems and methods supporting only static provisioning of service usage reporting.

Secondly, the usage may be reported on a per service instance basis. This contrasts with systems and methods supporting only usage reporting on a per service basis.

Thirdly, a finer granularity on the usage reporting policies may be provided, which may result in better usage experience and network resource utilization. For example, when a particular service instance reaches the granted quota, the quality of service (QoS) for that particular service instance may be updated, while keeping unaltered the QoS for the other service instances which still have remaining quota.

Fourthly, the need of provisioning as many services as the number of possible instances of that service may be avoided. For example, a streaming server may host multiple videos. It is possible to define in the deep packet inspection (DPI) engine of the PCEF 400 (i.e., in the determination means 418) inspection rules to identify packets belonging to a particular service instance. Thus, it is possible to define a single streaming service instead of defining one different service for each single video hosted at the streaming server.

Fifthly, embodiments of the invention may enable the operator to offer new policy and charging control services, such as a policy and charging control service thanks to which a end-user service (e.g., watching a movie) may be provided and enjoyed during a certain time or up to a certain volume, but wherein the usage of a service is limited for demo purposes for example. When the demo period is reached, the user may be offered the possibility to extend the usage of the service by buying a voucher.

Figure 19:
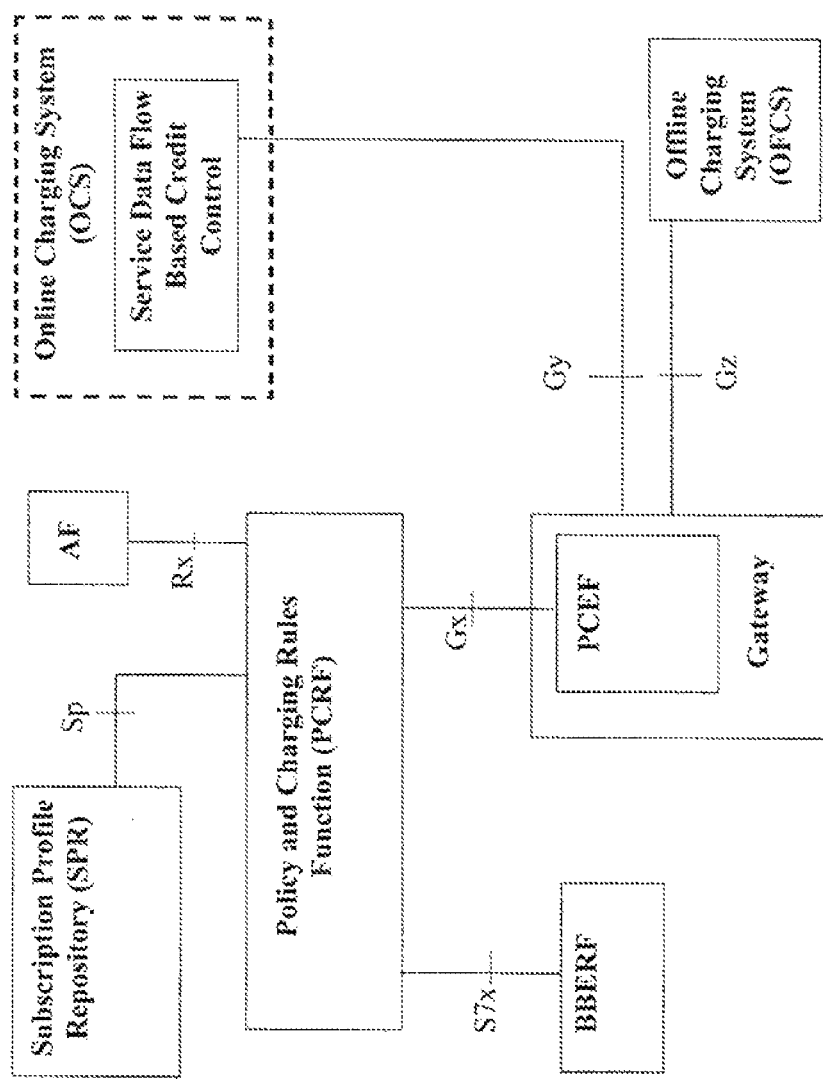
FIG. 19 schematically depicts a policy and charging control architecture for illustrating the background and problems underlying some embodiments of the invention.
Figure 20:
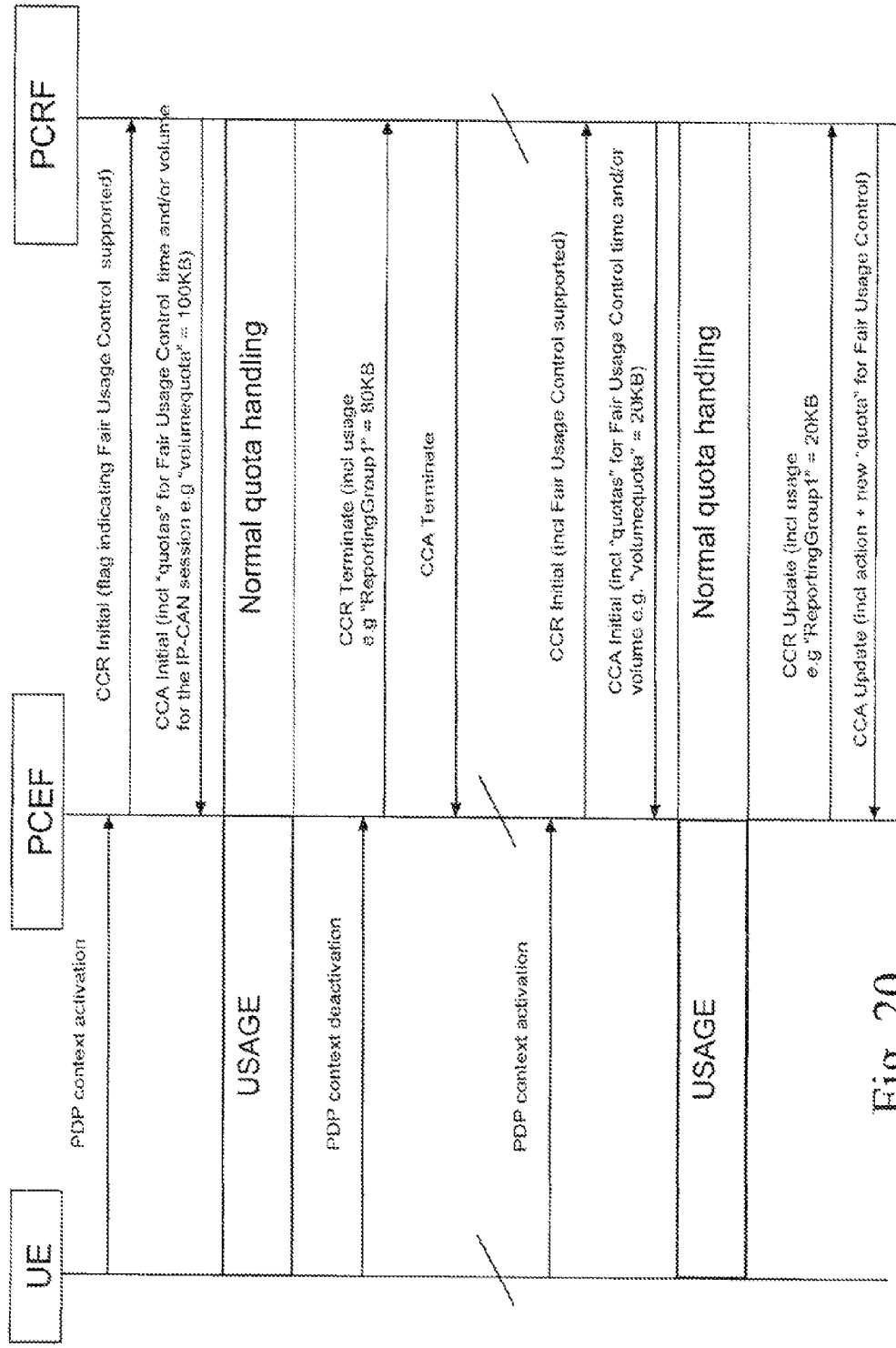
FIG. 20 illustrates an exemplary use of the fair usage control functionality for illustrating the background and problems underlying some embodiments of the invention.

FIGS. 19 and 20 provide further explanations of the context in which embodiments of the invention may be applied (as well as underlying problems which are solved), especially as far as policy and charging control (PCC) architectures and fair usage control are concerned.

A PCC architecture enables to integrate both policy and charging control. An exemplary architecture that supports PCC functionality is schematically illustrated in FIG. 19. The structure of FIG. 19 comes from 3GPP TS 23.203 "Policy and charging control architecture", which specifies the PCC functionality for evolved 3GPP packet switched domain, including both 3GPP accesses (GERAN/UTRAN/E-UTRAN) and non-3GPP accesses.

The Gx reference point is defined in 3GPP TS 29.212 "Policy and charging control over Gx reference point", and lies between the PCRF and the PCEF. The Gx reference point is used for provisioning and removal of PCC rules from the PCRF to the PCEF and the transmission of traffic plane events from the PCEF to the PCRF. The Gx reference point can be used for charging control, policy control or both.

The Rx reference point is defined in 3GPP TS 29.214 "Policy and charging control over Rx reference point" and is used to exchange application level session information between the PCRF and the AF. An example of PCRF is Ericsson Service-Aware Policy Controller (SAPC) (see for example F. Castro et al, "SAPC: Ericsson's convergent policy controller", Ericsson Review No. 1, 2010, pp. 4-9). An example of AF is the IP Multimedia Subsystem (IMS) proxy call session control function (P-CSCF).

Both Gx and Rx reference points may be based on Diameter (see P. Calhoun et al, "RFC 3588: Diameter Base Protocol", IETF, September 2003).

The deep packet inspection (DPI) technology supports packet inspection and service classification, which consists of IP packets classified according to a configured tree of rules so that they are assigned to a particular service session.

DPI may be implemented using the so-called traffic detection function (TDF), which can be either stand-alone or collocated with the PCEF (see 3GPP TR 23.813 "Study on policy solutions and enhancements" for details).

A fair usage control functionality may be built on top of the PCC architecture in order to provide an additional policy control based on accumulated usage.

This fair usage control functionality allows changing the QoS setting or other settings such as service authorization information per subscriber based on actual use in terms of volume, time and events with reference to specific subscriber quotas.

The fair usage control functionality may be based on two functions.

In the first fair usage control function, the PCRF is configured to instruct the PCEF as to when the reporting of usage for a service is to be carried out, wherein this may be done by setting quotas. The PCRF indicates to the PCEF a quota for volume and/or time for a service. The reported usage is accumulated in the PCRF per reporting group and a total usage. The PCRF uses this accumulated usage to perform the control actions.

In the second fair usage control function, the control actions are the result of the policy evaluation of types access and charging control and/or QoS control in the PCRF.

FIG. 20 schematically illustrates an exemplary use for this background fair usage control functionality (wherein "CCR" stands for "credit charging request" and "CCA" stands for "credit control application").

In contrast to the first and second fair usage control functions just described (which do not form part of the invention, but are presented for illustrating the context of the invention), embodiments of the invention go beyond by enabling the setting of quotas or usage limits per particular service instance of a service.

A fair usage control solution enables to control the usage for a service during a period of time, e.g. a month or the duration of an IP-CAN session, for services that are predefined in the PCRF. This means that it is possible to define a usage limit for a service that corresponds to a dynamic service identified from an AF, but the usage limit would apply to all the service instances that correspond to the predefined service in the PCRF.

For example, if the service "TV_Streaming" is defined, every time the user accesses the "TV_Streaming" service, the corresponding usage is accumulated. In that case however, it would not be possible to differentiate the usage that corresponds to a specific instance of the service, e.g. the access to the "TV_Streaming" service to watch a specific movie.

Another example is the case of P2P voice services like Skype. Without the invention, it would not be possible to control the usage in terms of duration of the call or amount of data for a specific call. Without the invention; it would only be possible to control the usage of P2P voice service during a period of time, e.g. the user is allowed to use two hours of Skype in one month, but it would not be possible to control the duration of a specific Skype session.

This means that, without the invention, it would not be possible to control for the operator the amount of volume or time that a subscriber is accessing without an interruption of the specific service. This is a limitation in the fair usage control solution in which the operator may want to limit for example the duration of the P2P calls or the usage of volume for a specific instance of a service. Overcoming this limitation (which is one aim of the invention) is of special interest for offerings wherein the operator would permit subscribers to test the use of a service during certain time or specific usage volume for free, and, if the subscriber is happy with the service, the subscriber could continue to use the service by buying a voucher for the use of the service. For example, the subscriber watches a football match during 5 minutes for free, and, when he or she realizes that the obtained quality of service reaches his or her expectations, the subscriber may buy a voucher to continue watching until the end of the match. These types of uses would not be possible with the previously described fair usage control solution.

In the previously described fair usage control solution, a network node with DPI capabilities (e.g. a GGSN) might be deployed in the operator's IP network and might capture the user and signalling traffic. The node might even be able to assign IP packets belonging to a particular service session and would also be able to detect service start and service stop conditions (e.g. for a streaming service based on RTSP protocol). However, in order to enable fair usage control on a per instance basis, the DPI needs to be enhanced in order to detect each service instance independently. Embodiments of the invention overcome these problems.

In accordance with embodiments of the invention, the level of granularity for control of reporting and for reporting is increased in order to permit to control the usage of specific instances of a service. This will now be described in further details, in relation to particular embodiments, to help in understanding the invention.

When the DPI node acting as an AF informs the PCRF of the activation of a service, such as for example "TV_streaming", Skype, etc, the PCRF determines that there is a quota for this type of service, i.e. Skype, "TV_Streaming", but also determines that there is a quota of usage for the specific instance of the service. This may be carried out in a dynamic way and may be based on subscription information, the type of service, type of media of the service, etc. For example, for "gold" subscribers, the duration of the specific Skype instances may be set to be longer than the specific Skype instances for "silver" subscribers.

The PCRF then makes available, to the PCEF, the quota for the specific instance of the service. When the PCRF indicates that a specific quota for an instance of a service exists, the PCEF accumulates the usage associated to the instance of the service and reports the usage of the specific instance of the service, for example, when the quota is exhausted.

A DPI engine may be configured to detect service instances. Taking as an example an RTSP/RTP streaming service, a DPI engine may be configured to detect each service instance individually (e.g., one user may be running two videos simultaneously: RTSP/RTP video 1 and RTSP/RTP video 2). In that context, a DPI engine may be configured to classify traffic into service sessions. Service classification is the process by which a certain IP packet is identified as pertaining to a specific content type and mapped to the corresponding service session. If there is no such service session yet, a new one is created. From this point on; the service session is the basis for control and reporting. Once the type of service is identified, the DPI engine can perform additional control functions/action. Each control function/action can be the trigger of interactions with external systems, redirections of the subscriber traffic, or even the dropping of the IP packet. Two main procedures the DPI engine may be configured to perform on the traffic in order to define the service involved are the traffic analysis and inspection, wherein the IP packets are inspected to extract information from them, and the traffic classification, wherein, based on the analyzed information, the IP packet is classified according to a configured tree of rules so that it is assigned to a particular service session. The DPI engine may use the packet context and stateful flow analysis information obtained during the inspection phase to classify the packet into the correct service or content type according to the available classification rules. The DPI engine classifies the packets in real time, as soon as they are inspected.

Embodiments of the invention propose an enhanced fair usage control by allowing a PCRF to dynamically configure usage reporting for service instances, at the time services are detected, and by supporting usage reporting and the control of usage reporting on a per service instance basis.

The Gx protocol between the PCRF and the PCEF is extended with other parameters in order to indicate the usage limit for a specific service instance.

In one embodiment of the invention, a fair usage control solution is enhanced by defining a new sub attribute-value pair (AVP), referred to for example as "[Instance-Identifier]", in the Multiple Service Credit Control (MSCC) AVP in credit control application (CCA) message or Re-Auth-Request (RAR) message, so as to indicate the usage limit for a particular instance of a service:

```
<Multiple-Services-Credit-Control> ::= < AVP Header: 456 >
 *[Granted-Service-Unit]
 *[Service-Identifier]
 *[Instance-Identifier]
```

Likewise, a new sub AVP, also referred to for example as "[Instance-Identifier]", is defined in MSCC AVP in the credit charging request (CCR) message, so as to indicate the usage of the specific instance of the service:

```
<Multiple-Services-Credit-Control> ::= < AVP Header: 456 >
 *[Used-Service-Unit]
 *[Service-Identifier]
 *[Instance-Identifier]
 *[Reporting-Reason]
```

In another embodiment of the invention, a fair usage control solution is enhanced by extending a protocol in order to indicate a usage limit and report usage for a particular instance of a service. In particular, a new sub attribute-value pair (AVP), referred to for example as "[Instance-Monitoring-Key]", is defined in a Usage-Monitoring-Information AVP, so as to indicate the usage limit for a particular instance of a service:

```
Usage-Monitoring-Information::= < AVP Header: xxxx >
 [Monitoring-key]
 [Instance-Monitoring-Key]
 [Granted-Service-Unit]
 [Used-Service-Unit]
 [Usage-Monitoring-Report]
 [Usage-Monitoring-Support]
 *[AVP]
```

The Rx protocol between the node with DPI capabilities and the PCRF may also be extended with additional parameters in order to indicate the specific instance of the service. Such solution according to embodiments of the invention may be applied to many deployment scenarios, whether a single node with DPI capabilities is acting both as AF and PCEF or whether they are different nodes, i.e. one node with DPI capabilities that acts as an AF and one that act as PCEF.

A further embodiment of the invention will now be described with reference to the flow diagram of FIG. 21.

This embodiment applies to the scenario in which the network node with DPI capabilities acts as AF towards the PCRF, and the Rx interface is used for service activation notification (indication of start condition from the AF to the PCRF). The PCEF is a different node and the Gx interface is used for usage reporting. As mentioned before, there are other possible scenarios, some of which will be described later on.

In this embodiment, both the AF and PCEF nodes have DPI capabilities, and they are configured for detecting service-related events (service start/modification/stop) and, additionally, they are configured for detecting service instances.

Two different sub-embodiments are explained regarding how to detect service instances with DPI, (1) RTSP/RTP and (2) SIP.

For the RTSP case, it is assumed that a video server hosts a number of movies. The user browses for example using a web portal through HTTP on the different movies in order to select one of them. When the user selects one movie, an RTSP message is triggered towards the video server (with the URL of the movie selected, for example rtsp://video.orange.com/video1.mov). The DPI engine of the AF detects the service instance for example by means of matching an RTSP.PLAY message including an URL wildcarded as rtsp://video.orange.com/*.mov). The DPI engine also stores the string of characters "video1.mov" as an identifier of the movie currently playing for the user.

Later on, it is assumed that the same user decides to open another movie in a different window (while the first movie is still playing), wherein all the corresponding signalling may be taking place on the same or on different TCP connections between the terminal and the video server. The DPI engine of the AF then detects the new service instance for example by means of matching an RTSP.PLAY message including an URL wildcarded as rtsp://video.orange.com/*.mov), but, in this case, the DPI engine of the AF detects that it is a new movie (rtsp://video.orange.com/video2.mov) since the DPI engine has previously stored the string of characters "video1.mov". This enables to distinguish the case wherein the user pauses and plays again the same movie and the case wherein a new service instance is created.

For SIP case, it is assumed that a user establishes a video call with another party. In that case, the terminal triggers a SIP INVITE with a certain call identifier "Call_Id1". The DPI engine of the AF detects the service instance for example by means of matching a successful SIP response (SIP 200OK) to the original SIP INVITE. The DPI engine of the AF also detects that it is a video call by means of the SDP information in SIP INVITE message (for example including a negotiation for a video codec). The DPI engine also stores the "Call_Id1" call identifier as the instance identifier for the video call service.

Later on, the same user decides to establish another video call with a third party (while the first video call is still ongoing). Note that this example does not correspond to the case of adding a third party to an existing video call (multi video-conference), but to the case of two independent video calls. The DPI engine then detects the new service instance for example by means of matching a successful SIP response (SIP 200OK) to the new SIP INVITE (in this case with a different call identifier "Call_Id", which is different than the one previously stored). Memorizing this is needed to avoid creating new service instances in case of detecting SIP re-INVITE messages corresponding to the first service instance (e.g. to add/modify/remove a media component, like adding a voice component to the video call).

Figure 21:
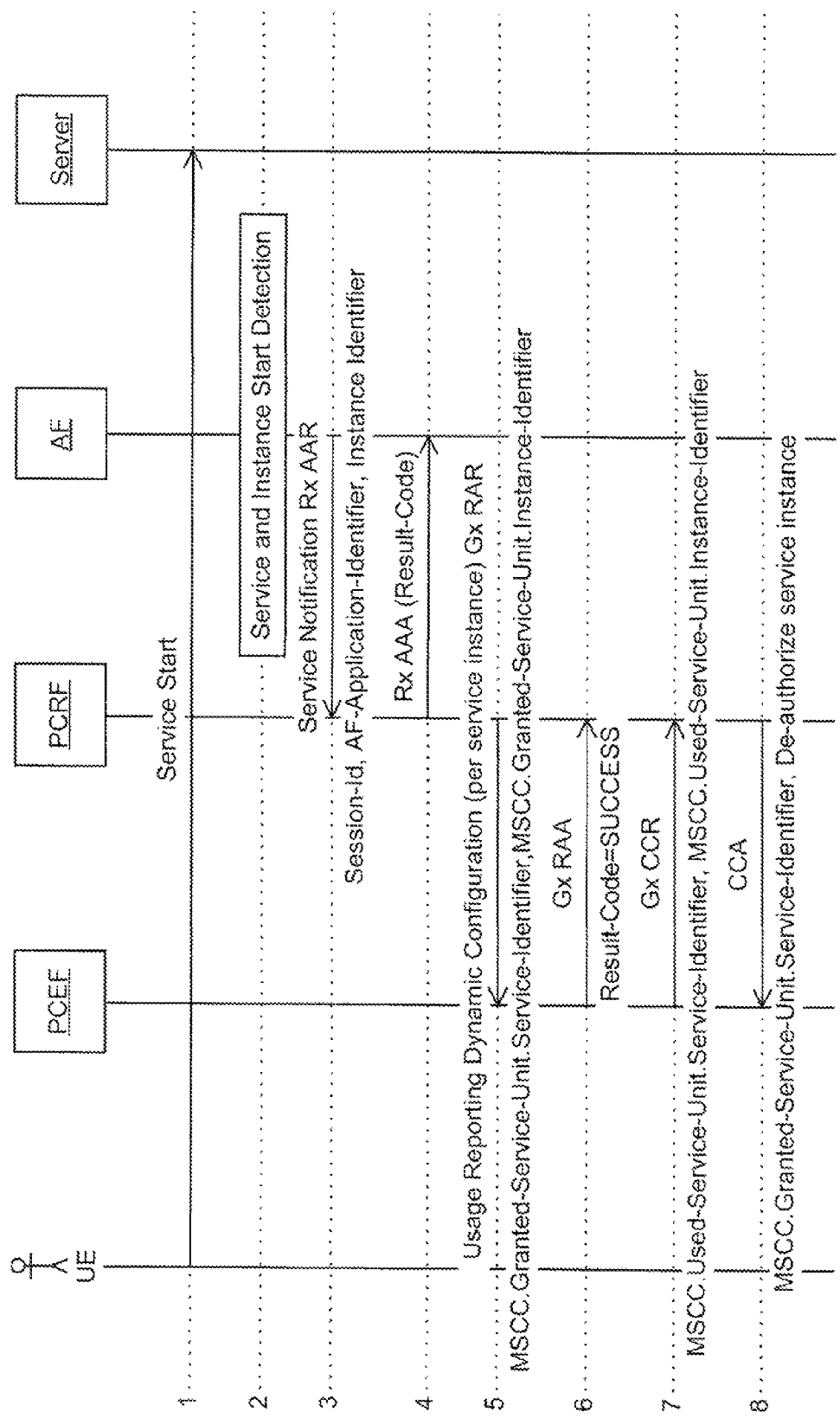
FIG. 21 illustrates a method in an embodiment of the invention.

The functionality according to an embodiment of the invention is schematically illustrated in FIG. 21 and may be described as follows:

(1) A user (UE) starts using a service, for example by accessing a movie (rtsp://video.orange.com/video1.mov).

(2) The DPI node, acting in this case as an AF towards the PCRF, detects the service instance as explained above.

(3) When the DPI node acting as AF node detects the service start condition, the DPI node (i.e. the AF) triggers an Rx Authentication and Authorization Request (AAR) message to the PCRF including information regarding the service detected and the specific instance (video1). Namely, the following information may be included:

---
AF-Application-Identifier=e.g. Orange_Video
Instance-Identifier, composed by:
<Instance-Identifier> ::= < AVP Header: TBD >
[Instance-Id]
[DPI-Rules]
---

The identifier "[Instance-Id]" enables, if the Rx is used between the AF and the PCRF, to identify the particular service instance in the PCRF and later in the PCEF.

The DPI rules "[DPI-Rules]" include information indicating that the PCEF needs to identify the specific service instance (by inspection of the packets). In some cases, it may be sufficient to use a 5-tuple information (in this case the Media-Component-Description AVP present in the AAR can be used). There are other cases that require OSI layer 7 information (e.g.: http://video.orange.com/video1.mov, http://video.orange.com/video2.mov)

The DPI-Rules are sent by AF to PCRF and then to PCEF when OSI layer 7 information is needed in order to identify the instance, in order for PCEF to be able to detect the particular service instance.

(4) The PCRF accepts the Rx AAR message ("Rx AAA (Result-Code)").

(5) The PCRF calculates the quota that applies for the service "Orange_Video" and the quota that applies for the particular service instance that has been activated. In order to determine the quota (or usage limit) for the particular service instance, the PCRF may use subscriber information such as the subscriber group (gold, silver, bronze), service related information (e.g. promotions done by the operator to permit access in a demo way to the Orange Video services), etc. For another video that is not promoted, the PCRF may decide not to assign any quota on a per instance basis.

In this example, the PCRF determines the following quota information: (1) Orange_Video has a quota of 50 Mbytes this month, (2) Any instance of the service has a quota of 5 Mbytes.

The PCRF triggers a Gx RAR message to the PCEF in order to dynamically configure usage reporting for that particular service and service instance.

A new sub AVP "[Instance-Identified]" is defined in MSCC AVP (or in Usage-Monitoring-Information AVP in another embodiment) in RAR message in order to indicate the quota for an instance:

---
<Multiple-Services-Credit-Control> ::= < AVP Header: 456 >
*[Granted-Service-Unit]
*[Service-Identifier]
*[Instance-Identifier]
---

In this case, the "[Instance-Identifier]" AVP conveys both the Instance-Id and DPI-Rules information, as OSI layer 7 information is needed in order to identify the service instance in the PCEF.

As shown above, the information regarding the instance rules is passed as part of the "[Instance-Identifier]" AVP in MSCC.

The following information is sent from the PCRF to the PCEF:
MSCC.Granted-Service-Unit.[Service-Identifier=Orange_Video]=50 Mbytes
MSCC.Granted-Service-Unit.[Instance-Id=Video1, DPI-Rules=http://video.orange.com/video1.mov]=5 Mbytes (6) The PCEF accepts the RAR ("Gx RAA"). The PCEF configures dynamically the quota for the service and service instance.

(7) The usage reporting by the PCEF is triggered when any of the quotas is reached. In this example, the instance quota is reached and a reporting of usage is done for both the service and service instance.

A new AVP "[Instance-Identifier]" is defined in MSCC AVP in CCR message (or in the Usage-Monitoring-Information AVP in another embodiment):

---
<Multiple-Services-Credit-Control> ::= < AVP Header: 456 >
*[Used-Service-Unit]
*[Service-Identifier]
*[Instance-Identifier]
*[Reporting-Reason]
---

In this case, the "[Instance-Identifier]" AVP just conveys the Instance-Id (and not DPI-Rules information).

The following information is sent from the PCRF to the PCEF:

MSCC.Used-Service-Unit.[Service-Identifier=Orange_Video]=5 Mbytes

MSCC.Used-Service-Unit.[Instance-Id=Video1, DPI-Rules=http://video.orange.com/video1.mov]=5 Mbytes (8) The PCRF receives the usage information and accumulates it. There is an accumulator for the service usage and other accumulator for the service instance usage.

Service Accumulated Usage for Orange_Video=5 Mbytes
Service Instance Accumulated Usage for Video1=5 Mbytes The PCRF applies the policy evaluation using the accumulated usage for the service and the instance. In this example, the operator has defined a policy that de-authorizes the service instance and de-configures the usage reporting for the instance "video1". Other possibility would be that the operator has defined a policy that permits to redirect the subscriber to a portal in which the subscriber can extend the quota for the instance.

The PCRF also provides the remaining usage quota for the service Orange_Video.

In case the user decides to buy a voucher (while watching the demo movie) in order to watch the whole movie (not shown in the call flow of FIG. 21), the provisioning system informs the PCRF and two things could happen:
- the PCRF directly de-configures usage reporting for that service instance as the user has just bought the voucher;
- the PCRF waits for the PCEF usage report on the service instance, and then it de-configures usage reporting for that service instance.

(9) The PCRF de-authorizes the service instance and de-configures the usage reporting for the instance.

The PCRF updates the quota for the service. In this case, there are 45 Mbytes of quota remaining for the service and sends this information:

MSCC.Granted-Service-Unit.[Service-Identifier=Orange_Video]=45 Mbytes

The de-authorization of the service instance is implicit as no quota for the service instance is provided by the PCRF.

Other possible actions may be to redirect the user to a portal, downgrade the bit rate for the service instance, etc.

Let us now turn to FIGS. 22a to 22d and FIGS. 23 to 26 schematically illustrating different embodiments of the invention. Four different embodiments are as follows, depending on the implementation of the packet inspection node that acts as AF:

Embodiment A1: The AF and PCEF nodes are the same, Rx interface is used for service notification and Gx interface is used for usage reporting (FIG. 22a).

Embodiment A2: The AF and PCEF nodes are the same, Gx interface is used both for service notification and usage reporting (FIG. 22b).

Embodiment A3: The AF and PCEF nodes are different, Rx interface is used for service notification and Gx interface is used for usage reporting (FIG. 22c). This is the case illustrated and described with reference to FIG. 21.

Embodiment A4: The AF and PCEF nodes are different, Gx interface is used both for service notification and usage reporting (FIG. 22d).

In all embodiments A1 to A4, it is assumed that the AF and the PCEF nodes have DPI capabilities, so that they are capable to detect service related events (service start/modification/stop). How the AF and PCEF nodes detect service events may be made by different means, such as for example by means of heuristic methods, etc.

Figure 23:
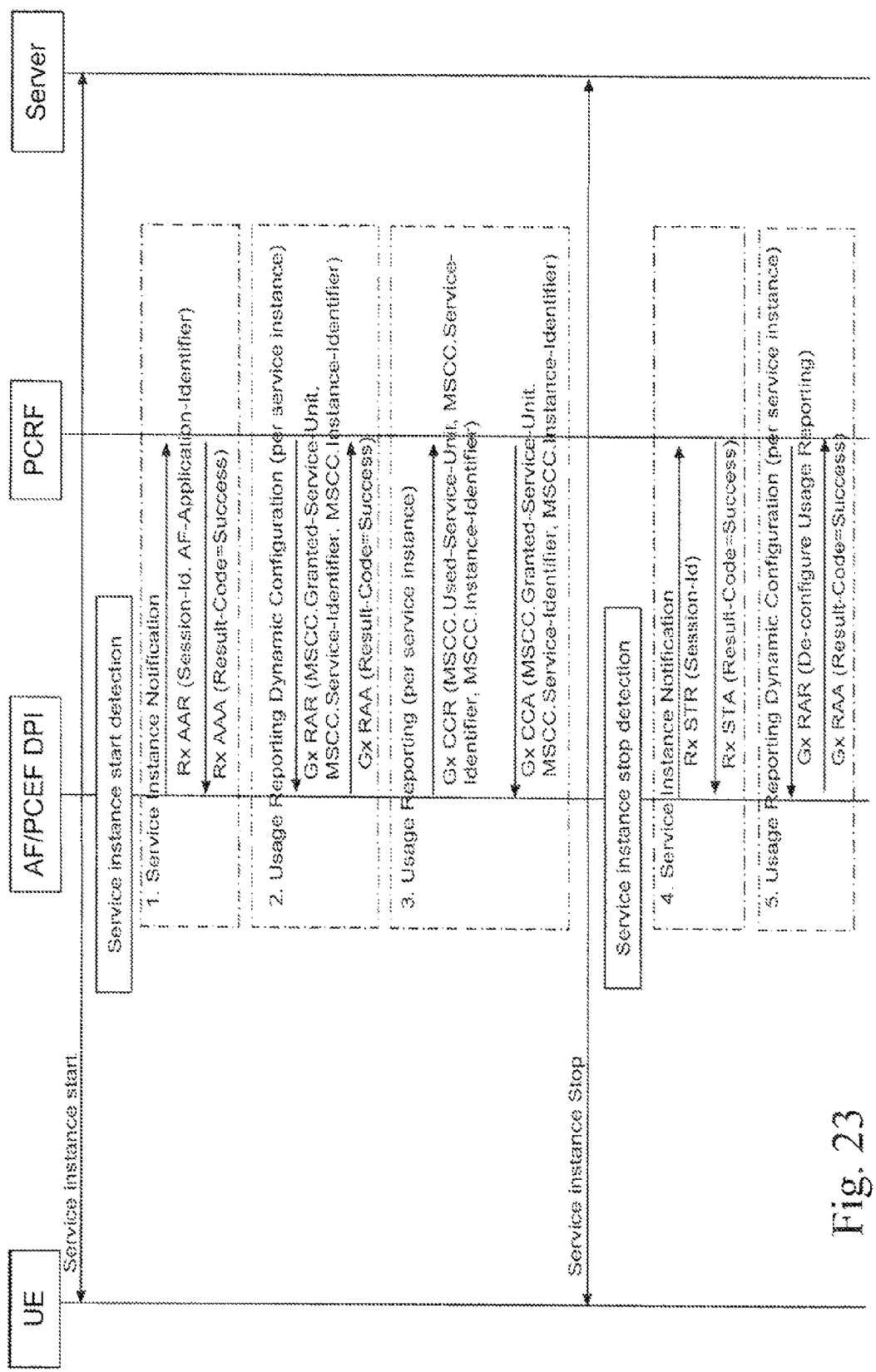

FIG. 23 schematically illustrates the call flow for embodiment A1 and may be described as follows:

In step 1, when AF/PCEF node detects the service start condition, it triggers an Rx MR message to the PCRF including information regarding the service detected (service identifier, service instance identifier, etc).

In this case, since the AF node and the PCEF node are the same (i.e., hosted on the same server), conventional Rx AVPs are sufficient to indicate the service detected (AF-Application-Identifier) and service instance detected (Session-Id can be used for that).

In step 2, the PCRF triggers a Gx RAR message to the AF/PCEF in order to dynamically configure usage reporting for that particular service instance.

A new sub AVP "[Instance-Identifier]" is defined in the MSCC AVP in the RAR message:

<Multiple-Services-Credit-Control> ::= < AVP Header: 456 >
*[Granted-Service-Unit]
*[Service-Identifier]
*[Instance-Identifier]

In step 3, usage reporting by the PCEF is triggered according to the configuration set in step 2 (i.e., according to the instructions sent by the PCRF).

A new sub AVP "[Instance-Identifier]" is defined in the MSCC AVP in the CCR message:

<Multiple-Services-Credit-Control> ::= < AVP Header: 456 >
*[Used-Service-Unit]
*[Service-Identifier]
*[Instance-Identifier]
*[Reporting-Reason]

In step 4, when the AF/PCEF node detects the service stop condition, it triggers an Rx STR message to PCRF.

In step 5, the PCRF triggers a Gx RAR message to the AF/PCEF in order to de-configure usage reporting for that service instance.

Although this is not shown in FIG. 23, re-configure usage reporting at detection of service modification events may also be carried out (i.e., detection of a change condition, as described above). An exemplary use of the service modification may be when the user pauses a running streaming service or when new flows are added to an existing service, like adding a video component to an existing IMS voice call, so that notification to the PCRF may trigger reconfiguration of usage reporting.

Figure 24:
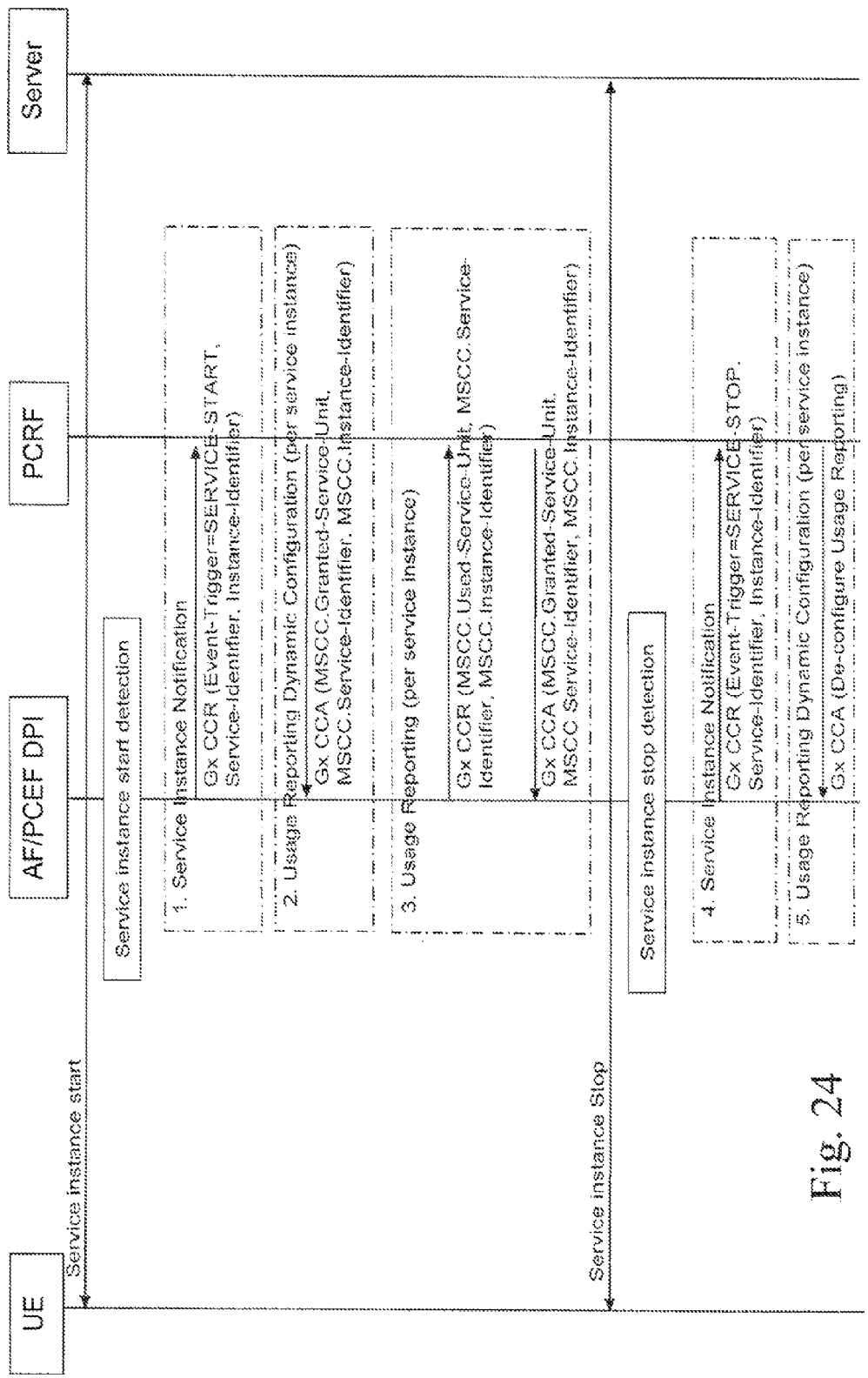

FIG. 24 schematically illustrates the call flow for embodiment A2 and may be described as follows:

In step 1, when the AF/PCEF node detects the service start condition, it triggers a Gx CCR message to the PCRF including information regarding the service detected (service identifier, service instance identifier, etc).

In this case, the service detection notification may involve the definition of a new service event trigger including information regarding the detected service and service instance.

In step 2, the PCRF triggers a Gx CCA response message to the AF/PCEF in order to dynamically configure usage reporting for that particular service instance.

A new sub AVP "[Instance-Identifier]" is defined in MSCC AVP in Gx CCA message:

```
<Multiple-Services-Credit-Control> ::= < AVP Header: 456 >
*[Granted-Service-Unit]
*[Service-Identifier]
*[Instance-Identifier]
```

In step 3, usage reporting by the PCEF is triggered according to the configuration set in step 2 (according to the instructions sent by the PCRF).

A new sub AVP "[Instance-Identifier]" is defined in the MSCC AVP in the Gx CCR message:

```
<Multiple-Services-Credit-Control> ::= < AVP Header: 456 >
*[Used-Service-Unit]
*[Service-Identifier]
*[Instance-Identifier]
*[Reporting-Reason]
```

In step 4, when the AF/PCEF node detects the service stop condition, the node triggers a Gx CCR message to PCRF indicating service stop condition.

In this case, the service detection notification through the Gx interface may involve the definition of a new service event trigger including information regarding the service and service instance stopped.

In step 5, the PCRF triggers a Gx CCA message to AF/PCEF in order to de-configure usage reporting for that service instance.

Although not shown in FIG. 24, re-configuring usage reporting at detection of service modification events is also possible (i.e., when detecting by the AF a change condition in relation to a particular service instance). An exemplary use for service modification may be when user pauses a running streaming service or when new flows are added to an existing service, like adding a video component to an existing IMS voice call, so notification to the PCRF might trigger reconfiguration of usage reporting.

Figure 25:
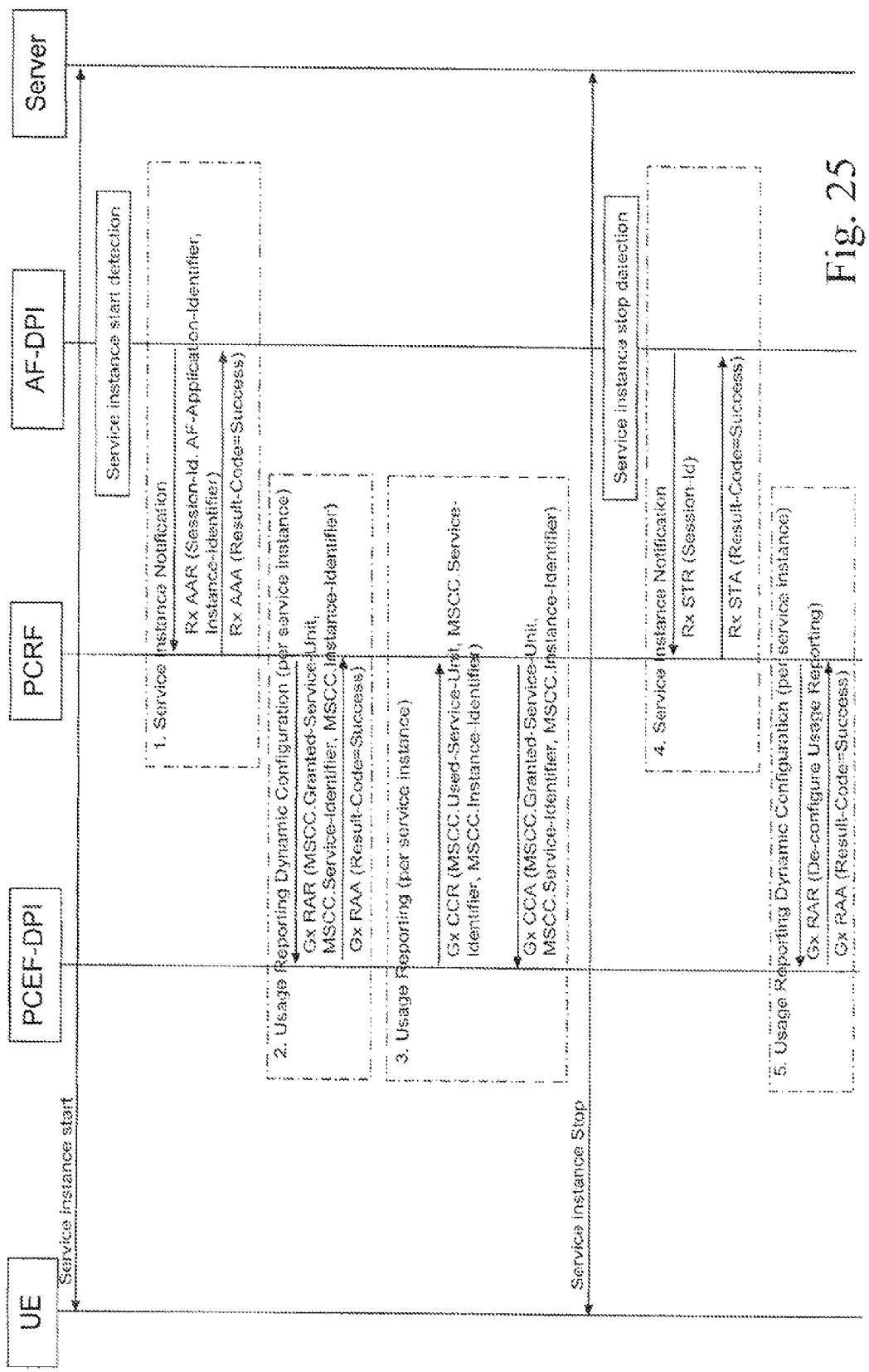

FIG. 25 schematically illustrates the call flow for embodiment A3 and may be described as follows:

In step 1, when the AF node detects the service start condition, it triggers an Rx AAR message to PCRF including information regarding the service detected (service identifier, service instance identifier, etc).

In this case, as AF and PCEF nodes are different (hosted on different servers), the conventional Rx AVPs are not enough and a new AVP is defined in Rx AAR message:

```
<Instance-Identifier> ::= < AVP Header: TBD >
[Instance-Id]
[DPI-Rules]
```

The DPI-Rules are sent by the AF to the PCRF and then to the PCEF, in order for the PCEF to be able to detect the particular service instance (when deeply inspecting a received packet).

In step 2, the PCRF triggers a Gx RAR message to the PCEF in order to dynamically configure usage reporting for that particular service instance.

A new sub AVP "[Instance-Identifier]" is defined in the MSCC AVP in the RAR message:

```
<Multiple-Services-Credit-Control> ::= < AVP Header: 456 >
*[Granted-Service-Unit]
*[Service-Identifier]
*[Instance-Identifier]
```

In this case, the [Instance-Identifier] AVP conveys both the Instance-Id and DPI-Rules information.

In step 3, usage reporting by the PCEF is triggered according to the configuration set in step 2.

A new AVP "[Instance-Identifier]" is defined in the MSCC AVP in the Gx CCR message:

```
<Multiple-Services-Credit-Control> ::= < AVP Header: 456 >
*[Used-Service-Unit]
*[Service-Identifier]
*[Instance-Identifier]
*[Reporting-Reason]
```

In this case, the Instance-Identifier AVP just conveys the Instance-Id (and not DPI-Rules information).

In step 4, when AF node detects the service stop condition, it triggers an Rx STR message to PCRF.

In step 5, the PCRF triggers a Gx RAR message to the PCEF in order to de-configure usage reporting for that service instance.

In this case, the Instance-Identifier AVP in MSCC just conveys the Instance-Id (and not DPI-Rules information).

Although not shown in FIG. 25, but re-configuring usage reporting at detection of service modification events may be carried out (i.e., detection by the AF of a change condition). An exemplary use for the service modification is when user pauses a running streaming service or when new flows are added to an existing service, like adding a video component to an existing IMS voice call, so that notification to the PCRF might trigger reconfiguration of usage reporting.

Figure 26:
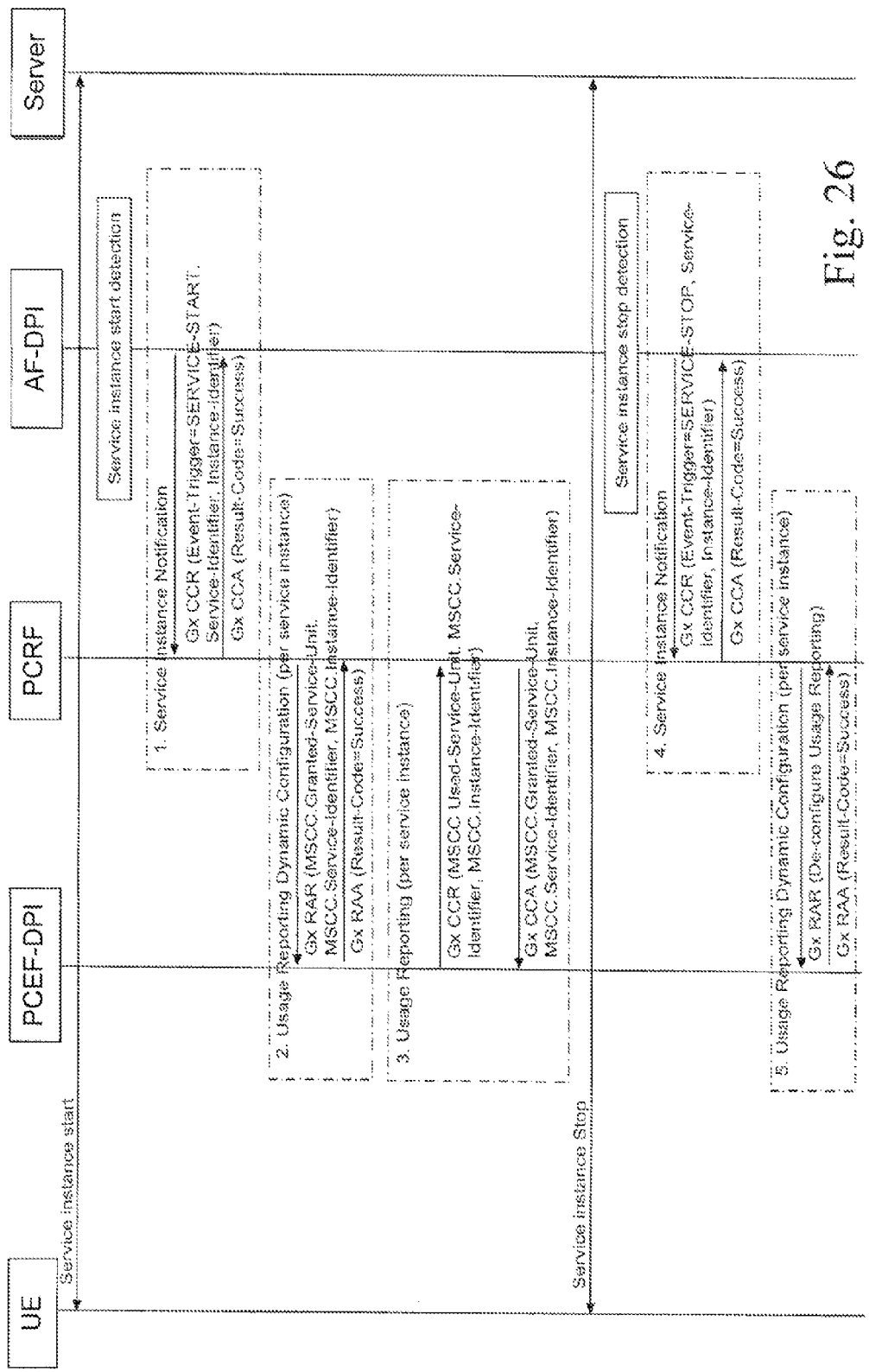

FIG. 26 schematically illustrates the call flow for embodiment A4 and may be described as follows:

In step 1, when AF node detects the service start condition, the AF node triggers a Gx CCR message to the PCRF including information regarding the service detected (service identifier, service instance identifier, etc).

In this case, the service detection notification through the Gx interface may involve defining a new service event trigger including information regarding the service and service instance detected. In this case, as AF and PCEF nodes are different (i.e. hosted on different servers), the service instance identifier also carries the DPI-Rules:

```
<Instance-Identifier> ::= < AVP Header: TBD >
[Instance-Id]
[DPI-Rules]
```

The DPI-Rules are sent by the AF to the PCRF and then to the PCEF, in order for the PCEF to be able to detect the particular service instance (when deeply inspecting the received packets).

In step 2, the PCRF triggers a Gx RAR message to the PCEF in order to dynamically configure usage reporting for that particular service instance.

A new sub AVP "[Instance-Identified]" is defined in the MSCC AVP in the RAR message:

```
<Multiple-Services-Credit-Control> ::= < AVP Header: 456 >
*[Granted-Service-Unit]
*[Service-Identifier]
*[Instance-Identifier]
```

In this case, the Instance-Identifier AVP conveys both the Instance-Id and the DPI-Rules information.

In step 3, usage reporting by PCEF is triggered according to the configuration set in step 2.

A new sub AVP "[Instance-Identified]" is defined in the MSCC AVP in the CCR message:

```
<Multiple-Services-Credit-Control> ::= < AVP Header: 456 >
*[Used-Service-Unit]
*[Service-Identifier]
*[Instance-Identifier]
*[Reporting-Reason]
```

In step 4, when the AF node detects the service stop condition, it triggers a Gx CCR message to the PCRF indicating service stop.

In this case, the service detection notification through the Gx interface may involve defining a new service event trigger, including information regarding the service and service instance stopped.

In this case, the "[Instance-Identifier]" AVP just conveys the Instance-Id (and no DPI-Rules information).

In step 5, the PCRF triggers a Gx RAR message to the PCEF in order to de-configure usage reporting for that service instance.

In this case, the "[Instance-Identifier]" AVP in MSCC will just convey the Instance-Id (and no DPI-Rules information).

Although not shown in FIG. 26, but it is also possible to re-configure usage reporting at detection of service modification events (i.e., when the AF detects a change condition in relation to a particular service instance). An exemplary use for service modification would be when user pauses a running streaming service or when new flows are added to an existing service, like adding a video component to an existing IMS voice call, so notification to the PCRF might trigger reconfiguration of usage reporting.

The physical entities according to the invention, including the servers may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "identification obtainer", "packet receiver", "service instance determiner", etc. are used herewith, no restriction is made regarding how distributed these elements may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a server, or a network node, may be implemented in hardware, software, field-programmable gate array (FPGA), application-specific integrated circuit (ASICs), firmware or the like.

In further embodiments of the invention, any one of the above-mentioned and/or claimed identification obtainer, packet receiver, service instance determiner, etc. is replaced by identification obtaining means, packet receiving means, service instance determining means, etc. respectively, or by an identification obtaining unit, packet receiving unit, service instance determining unit, etc. respectively, for performing the functions of the identification obtainer, packet receiver, service instance determiner, etc.

In further embodiments of the invention, any one of the above-described steps may be implemented using computer-readable instructions, for example in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A policy and charging control method carried out by a first server having a policy and charging enforcement function (PCEF) and by a second server having a policy and charging rules function (PCRF), the method comprising the steps of:
    obtaining identification information for enabling the PCEF to identify from a plurality of service instances, a particular service instance of a particular service type;
    receiving a packet by the PCEF;
    determining by the PCEF, whether the packet belongs to the particular service instance by using the identification information and by inspection of at least one of:
        Open Systems Interconnection (OSI) layer n control information of the packet, wherein n is an integer equal to or larger than 3; and
        the packet's payload encapsulated by OSI layer 7 control information;
    upon determining that the packet belongs to the particular service instance, updating by the PCEF, a usage parameter representing or identifying an accumulated usage associated with the particular service instance;
    making available by the PCEF, and obtaining accordingly by the PCRF, the usage parameter or information derived from the usage parameter and associated with the particular service instance;
    determining by the PCRF, based on the usage parameter or information derived from the usage parameter, new policy and charging rules to be enforced; and
    making available by the PCRF, and obtaining accordingly, by the PCEF, the new policy and charging rules to be enforced.

2. The method of claim 1, further comprising obtaining by the PCEF, a usage limit for the particular service instance.

3. The method of claim 2, wherein making available the usage parameter or information derived from the usage parameter includes
    making available, when the accumulated usage represented or identified by the usage parameter has reached or exceeded the usage limit, an indication that the usage parameter has reached or exceeded the usage limit.

4. A policy and charging control method carried out by a first server including an application function (AF), by a second server having a policy and charging rules function (PCRF), and by a third server having a policy and charging enforcement function (PCEF), the method comprising the steps of:
  receiving a packet by the AF;
  determining by the AF, whether the packet corresponds to a start condition in relation to a particular service instance of a particular service type by deep inspection of at least one of:
    Open Systems Interconnection (OSI) layer n control information of the packet, wherein n is an integer equal to or larger than 3; and
    the packet's payload encapsulated by OSI layer 7 control information;
  when the packet corresponds to the start condition, making available by the AF, and obtaining accordingly by the PCRF, identification information for identifying the particular service instance;
  when the packet does not correspond to the start condition, determining by the AF, whether the received packet corresponds to a change condition in relation to a particular service instance;
  when the packet corresponds to a change condition, making available by the AF, and obtaining accordingly, by the PCRF, an indication that the packet corresponds to a change condition;
  determining by the PCRF, at least one of a new usage limit for the particular service instance and new policy and charging rules to be enforced; and
  making available by the PCRF, and obtaining accordingly, by the PCEF, the at least one of the new usage limit for the particular service instance and the new policy and charging rules to be enforced.

5. The method of claim 4, further comprising the steps of:
  determining by the AF, whether the received packet corresponds to a stop condition in relation to a particular service instance;
  upon determining that the packet corresponds to a stop condition, making available by the AF, and obtaining accordingly, by the PCRF, an indication that the packet corresponds to a stop condition; and
  making available by the PCRF, and obtaining accordingly, by the PCEF, instructions to stop using the identification information for identifying the particular service instance in relation to which a stop condition has been identified and to stop updating a usage parameter for the particular service instance.

6. A server configured for implementing a policy and charging enforcement function (PCEF), the server comprising:
  an identification obtainer configured for obtaining identification information for enabling the PCEF to identify from a plurality of service instances, a particular service instance of a particular service type;
  a packet receiver configured for receiving a packet;
  a service instance determiner configured for determining whether the packet belongs to the particular service instance by using the identification information and by deep inspection of at least one of:
    Open Systems Interconnection (OSI) layer n control information of the packet, wherein n is an integer equal to or larger than 3; and
    the packet's payload encapsulated by OSI layer 7 control information;
  a usage parameter updater configured for updating a usage parameter representing or identifying an accumulated usage associated with the particular service instance; and
  a usage parameter sender configured for making available, to a policy and charging rules function (PCRF), the usage parameter or information derived from the usage parameter and associated with the particular service instance;
  wherein the usage parameter sender is configured for making available the usage parameter or information derived from the usage parameter by making available, when the accumulated usage represented or identified by the usage parameter has reached or exceeded a usage limit, an indication that the usage parameter has reached or exceeded the usage limit.

7. The server of claim 6, further comprising a usage limit obtainer configured for obtaining the usage limit for the particular service instance.

8. A system, comprising:
  a PCEF server configured for implementing a policy and charging enforcement function (PCEF); and
  a PCRF server (500) in communication with the PCEF server, the PCRF server configured for implementing a policy and charging rules function (PCRF);
  wherein the PCEF server comprises:
    an identification obtainer configured for obtaining identification information for enabling the PCEF to identify from a plurality of service instances, a particular service instance of a particular service type;
    a packet receiver configured for receiving a packet;
    a service instance determiner configured for determining whether the packet belongs to the particular service instance by using the identification information and by inspection of at least one of:
      Open Systems Interconnection (OSI) layer n control information of the packet, wherein n is an integer equal to or larger than 3; and
      the packet's payload encapsulated by OSI layer 7 control information;
    a usage parameter updater configured for updating a usage parameter representing or identifying an accumulated usage associated with the particular service instance upon determining that the packet belongs to the particular service instance; and
    a usage parameter sender configured for making available to the PCRF, the usage parameter or information derived from the usage parameter and associated with the particular service instance;
  wherein the PCRF server comprises:
    a usage parameter obtainer configured for obtaining the usage parameter or information derived from the usage parameter and associated with the particular service instance;
    a policy and charging rule determiner configured for determining, based on the usage parameter or information derived from the usage parameter, new policy and charging rules to be enforced; and
    a policy and charging rule sender configured for making available the new policy and charging rules to be enforced;
  wherein the PCEF server further comprises a policy and charging rule obtainer configured for obtaining the new policy and charging rules to be enforced.

9. The system of claim 8, further comprising an AF server configured for implementing an application function (AF), the AF server comprising:
  a packet receiver configured for receiving a packet;
  a start condition determiner configured for determining whether the packet corresponds to a start condition in relation to a particular service instance of a particular service type by inspection of at least one of:
the OSI layer n control information of the packet, wherein n is an integer equal to or larger than 3; and
the packet's payload encapsulated by OSI layer 7 control information; and an identification sender configured for making available to the PCRF, identification information for identifying the particular service instance upon determining that the packet corresponds to a start condition.

* * * * *

UNITED STATES PATENT AND TRADEMARK OFFICE
CERTIFICATE OF CORRECTION

PATENT NO. : 8,732,303 B2  
APPLICATION NO. : 13/279750  
DATED : May 20, 2014  
INVENTOR(S) : Lopez Nieto et al.

Page 1 of 1

It is certified that error appears in the above-identified patent and that said Letters Patent is hereby corrected as shown below:

In the Specification

In Column 8, Line 16, delete "is In" and insert -- is in --, therefor.

In Column 13, Line 27, delete "server 510" and insert -- server 500 --, therefor.

In Column 14, Line 32, delete "PCRF 400" and insert -- PCRF 500 --, therefor.

In Column 16, Line 21, delete "invention;" and insert -- invention, --, therefor.

In Column 17, Line 22, delete "on;" and insert -- on, --, therefor.

In Column 19, Line 30, delete ""Call_Id"," and insert -- "Call_Id2", --, therefor.

In Column 20, Line 25, delete ""[Instance-Identified]"" and insert -- "[Instance-Identifier]" --, therefor.

In Column 22, Line 6, delete "R×MR" and insert -- R× AAR --, therefor.

In Column 24, Line 66, delete ""[Instance-Identified]"" and insert -- "[Instance-Identifier]" --, therefor.

In Column 25, Line 12, delete ""[Instance-Identified]"" and insert -- "[Instance-Identifier]" --, therefor.

Signed and Sealed this  
Thirty-first Day of March, 2015

Michelle K. Lee  
*Director of the United States Patent and Trademark Office*